United States Patent
Grant et al.

(10) Patent No.: US 8,157,650 B2
(45) Date of Patent: Apr. 17, 2012

(54) SYSTEMS AND METHODS FOR CASINO GAMING HAPTICS

(75) Inventors: Danny A. Grant, Laval (CA); Gregory M. G. Belaus, Santa Clara, CA (US); Neil T. Olien, Montreal (CA); Henrique Da Costa, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 1236 days.

(21) Appl. No.: 11/855,009

(22) Filed: Sep. 13, 2007

(65) Prior Publication Data
US 2008/0064499 A1 Mar. 13, 2008

Related U.S. Application Data

(60) Provisional application No. 60/844,316, filed on Sep. 13, 2006.

(51) Int. Cl.
*A63F 9/24* (2006.01)
(52) U.S. Cl. .............................. 463/36; 463/20; 463/31
(58) Field of Classification Search ................ 463/36, 463/20, 31
See application file for complete search history.

(56) References Cited

U.S. PATENT DOCUMENTS

| | | | |
|---|---|---|---|
| 2,524,782 A | 10/1950 | Ferrer et al. |
| 3,490,059 A | 1/1970 | Paulsen et al. |
| 3,623,046 A | 11/1971 | Scourtes |
| 3,875,488 A | 4/1975 | Crocker et al. |
| 4,050,265 A | 9/1977 | Drennen et al. |
| 4,103,155 A | 7/1978 | Clark |
| 4,125,800 A | 11/1978 | Jones |
| 4,148,014 A | 4/1979 | Burson |
| 4,311,980 A | 1/1982 | Prusenziati |
| 4,385,836 A | 5/1983 | Schmitt |
| 4,391,282 A | 7/1983 | Ando et al. |

(Continued)

FOREIGN PATENT DOCUMENTS
EP 0 085 518 B1 8/1989
(Continued)

OTHER PUBLICATIONS

Patent Cooperation Treaty, Notification concerning Transmittal of International Preliminary Report on Patentability and Written Opinion, International Application No. PCT/US2007/019986, mailed Mar. 26, 2009.

(Continued)

*Primary Examiner* — Pierre E Elisca
(74) *Attorney, Agent, or Firm* — Kilpatrick Townsend & Stockton LLP

(57) ABSTRACT

Systems, methods, and products for self-contained casino gaming haptics are disclosed. For example, one disclosed system for casino gaming haptics includes a touch-sensitive input device configured to sense a contact from a user; an actuator coupled to the touch-sensitive input device, the actuator configured to output a haptic effect to the touch-sensitive input device; and a processor in communication with the touch-sensitive input device and the actuator, the processor configured to: generate a display signal configured to cause an image associated with a casino game to be displayed; receive an input signal from the touch-sensitive input device associated with the contact; determine an interaction between the contact and the image; and generate an actuator signal associated with the interaction, the actuator signal configured to cause the actuator to generate a haptic effect.

35 Claims, 14 Drawing Sheets

U.S. PATENT DOCUMENTS

| | | |
|---|---|---|
| 4,400,790 A | 8/1983 | Chambers et al. |
| 4,443,952 A | 4/1984 | Schulien et al. |
| 4,546,347 A | 10/1985 | Kirsch |
| 4,637,264 A | 1/1987 | Takahashi et al. |
| 4,639,884 A | 1/1987 | Sagues |
| 4,678,908 A | 7/1987 | LaPlante |
| 4,680,466 A | 7/1987 | Kuwahara et al. |
| 4,692,726 A | 9/1987 | Green et al. |
| 4,695,266 A | 9/1987 | Hui |
| 4,699,043 A | 10/1987 | Violante De Dionigi |
| 4,712,101 A | 12/1987 | Culver |
| 4,724,715 A | 2/1988 | Culver |
| 4,728,954 A | 3/1988 | Phelan et al. |
| 4,734,685 A | 3/1988 | Watanabe |
| 4,776,701 A | 10/1988 | Pettigrew |
| 4,794,384 A | 12/1988 | Jackson |
| 4,795,901 A | 1/1989 | Kitazawa |
| 4,799,055 A | 1/1989 | Nestler et al. |
| 4,803,413 A | 2/1989 | Kendig et al. |
| 4,811,608 A | 3/1989 | Hilton |
| 4,815,006 A | 3/1989 | Andersson et al. |
| 4,819,195 A | 4/1989 | Bell et al. |
| 4,823,106 A | 4/1989 | Lovell |
| 4,825,157 A | 4/1989 | Mikan |
| 4,840,634 A | 6/1989 | Muller et al. |
| 4,851,771 A | 7/1989 | Ikeda et al. |
| 4,860,051 A | 8/1989 | Taniguchi et al. |
| 4,891,889 A | 1/1990 | Tomelleri |
| 4,906,843 A | 3/1990 | Jones et al. |
| 4,914,976 A | 4/1990 | Wyllie |
| 4,935,725 A | 6/1990 | Turnau |
| 4,935,728 A | 6/1990 | Kley |
| 4,937,685 A | 6/1990 | Barker et al. |
| 4,940,234 A | 7/1990 | Ishida et al. |
| 4,962,448 A | 10/1990 | DeMaio et al. |
| 4,964,837 A | 10/1990 | Collier |
| 4,965,446 A | 10/1990 | Vyse |
| 4,982,504 A | 1/1991 | Soderberg et al. |
| 5,006,703 A | 4/1991 | Shikunami et al. |
| 5,024,626 A | 6/1991 | Robbins et al. |
| 5,053,975 A | 10/1991 | Tsuchihashi et al. |
| 5,062,830 A | 11/1991 | Dunlap |
| 5,065,145 A | 11/1991 | Purcell |
| 5,068,529 A | 11/1991 | Ohno et al. |
| 5,079,845 A | 1/1992 | Childers |
| 5,086,197 A | 2/1992 | Liou |
| 5,095,303 A | 3/1992 | Clark et al. |
| 5,107,080 A | 4/1992 | Rosen |
| 5,113,179 A | 5/1992 | Scott-Jackson et al. |
| 5,116,051 A | 5/1992 | Moncrief et al. |
| 5,125,261 A | 6/1992 | Powley |
| 5,132,927 A | 7/1992 | Lenoski et al. |
| 5,138,154 A | 8/1992 | Hotelling |
| 5,139,261 A | 8/1992 | Openiano |
| 5,148,377 A | 9/1992 | McDonald |
| 5,155,423 A | 10/1992 | Karlen et al. |
| 5,168,268 A | 12/1992 | Levy |
| 5,182,557 A | 1/1993 | Lang |
| 5,195,179 A | 3/1993 | Tokunaga |
| 5,195,920 A | 3/1993 | Collier |
| 5,202,961 A | 4/1993 | Mills et al. |
| 5,204,600 A | 4/1993 | Kahkoska |
| 5,209,131 A | 5/1993 | Baxter |
| 5,216,337 A | 6/1993 | Orton et al. |
| 5,223,658 A | 6/1993 | Suzuki |
| 5,229,836 A | 7/1993 | Nagano |
| 5,230,623 A | 7/1993 | Guthrie et al. |
| 5,235,868 A | 8/1993 | Culver |
| 5,239,249 A | 8/1993 | Ono |
| 5,246,316 A | 9/1993 | Smith |
| 5,247,648 A | 9/1993 | Watkins et al. |
| 5,254,919 A | 10/1993 | Bridges et al. |
| 5,275,565 A | 1/1994 | Moncrief |
| 5,280,276 A | 1/1994 | Kwok |
| 5,284,330 A | 2/1994 | Carlson et al. |
| 5,289,273 A | 2/1994 | Lang |
| 5,296,846 A | 3/1994 | Ledley |
| 5,313,229 A | 5/1994 | Gilligan et al. |
| 5,313,230 A | 5/1994 | Venolia et al. |
| 5,317,336 A | 5/1994 | Hall |
| 5,329,289 A | 7/1994 | Sakamoto et al. |
| 5,341,459 A | 8/1994 | Backes |
| 5,351,692 A | 10/1994 | Dow et al. |
| 5,359,193 A | 10/1994 | Nyui et al. |
| 5,374,942 A | 12/1994 | Gilligan et al. |
| 5,379,663 A | 1/1995 | Hara |
| 5,384,460 A | 1/1995 | Tseng |
| 5,390,128 A | 2/1995 | Ryan et al. |
| 5,390,296 A | 2/1995 | Crandall et al. |
| 5,396,267 A | 3/1995 | Bouton |
| 5,397,323 A | 3/1995 | Taylor et al. |
| 5,398,044 A | 3/1995 | Hill |
| 5,402,499 A | 3/1995 | Robison et al. |
| 5,402,582 A | 4/1995 | Raab |
| 5,402,680 A | 4/1995 | Korenaga |
| 5,417,696 A | 5/1995 | Kashuba et al. |
| 5,428,748 A | 6/1995 | Davidson et al. |
| 5,436,542 A | 7/1995 | Petelin et al. |
| 5,436,640 A | 7/1995 | Reeves |
| 5,452,615 A | 9/1995 | Hilton |
| 5,457,479 A | 10/1995 | Cheng |
| 5,457,793 A | 10/1995 | Elko et al. |
| 5,467,763 A | 11/1995 | McMahon et al. |
| 5,473,344 A | 12/1995 | Bacon et al. |
| 5,474,082 A | 12/1995 | Junker |
| 5,481,914 A | 1/1996 | Ward |
| 5,491,477 A | 2/1996 | Clark et al. |
| 5,512,919 A | 4/1996 | Araki |
| 5,514,150 A | 5/1996 | Rostoker |
| 5,524,195 A | 6/1996 | Clanton, III et al. |
| 5,526,022 A | 6/1996 | Donahue et al. |
| 5,530,455 A | 6/1996 | Gillick et al. |
| 5,543,821 A | 8/1996 | Marchis et al. |
| 5,547,383 A | 8/1996 | Yamaguchi |
| 5,550,562 A | 8/1996 | Aoki et al. |
| 5,550,563 A | 8/1996 | Matheny et al. |
| 5,570,111 A | 10/1996 | Barrett et al. |
| 5,576,727 A | 11/1996 | Rosenberg et al. |
| 5,583,407 A | 12/1996 | Yamaguchi |
| 5,591,924 A | 1/1997 | Hilton |
| 5,592,401 A | 1/1997 | Kramer |
| 5,604,345 A | 2/1997 | Matsuura |
| 5,611,731 A | 3/1997 | Bouton et al. |
| 5,623,582 A | 4/1997 | Rosenberg |
| 5,623,642 A | 4/1997 | Katz et al. |
| 5,627,531 A | 5/1997 | Posso et al. |
| 5,628,686 A | 5/1997 | Svancarek et al. |
| 5,635,897 A | 6/1997 | Kuo |
| 5,638,421 A | 6/1997 | Serrano et al. |
| 5,652,603 A | 7/1997 | Abrams |
| 5,666,138 A | 9/1997 | Culver |
| 5,680,141 A | 10/1997 | Didomenico et al. |
| 5,691,747 A | 11/1997 | Amano |
| 5,694,153 A | 12/1997 | Aoyagi et al. |
| 5,722,071 A | 2/1998 | Berg et al. |
| 5,724,106 A | 3/1998 | Autry et al. |
| 5,724,264 A | 3/1998 | Rosenberg et al. |
| 5,734,108 A | 3/1998 | Walker et al. |
| 5,740,083 A | 4/1998 | Anderson et al. |
| 5,745,057 A | 4/1998 | Sasaki et al. |
| 5,749,577 A | 5/1998 | Couch et al. |
| 5,755,620 A | 5/1998 | Yamamoto et al. |
| 5,763,874 A | 6/1998 | Luciano et al. |
| 5,767,836 A | 6/1998 | Scheffer et al. |
| 5,771,037 A | 6/1998 | Jackson |
| 5,795,228 A | 8/1998 | Trumbull et al. |
| 5,808,568 A | 9/1998 | Wu |
| 5,808,603 A | 9/1998 | Chen |
| 5,818,426 A | 10/1998 | Tierney et al. |
| 5,825,305 A | 10/1998 | Biferno |
| 5,828,295 A | 10/1998 | Mittel et al. |
| 5,831,593 A | 11/1998 | Rutledge |
| 5,841,133 A | 11/1998 | Omi |
| 5,841,423 A | 11/1998 | Carroll, Jr. et al. |
| 5,841,428 A | 11/1998 | Jaeger et al. |
| 5,844,673 A | 12/1998 | Ivers |
| 5,877,748 A | 3/1999 | Redlich |

| | | | |
|---|---|---|---|
| 5,879,327 A | 3/1999 | Moreau DeFarges et al. | |
| 5,889,506 A | 3/1999 | Lopresti et al. | |
| 5,912,661 A | 6/1999 | Siddiqui | |
| 5,917,486 A | 6/1999 | Rylander | |
| 5,919,159 A | 7/1999 | Lilley et al. | |
| 5,936,613 A | 8/1999 | Jaeger et al. | |
| 5,954,689 A | 9/1999 | Poulsen | |
| 5,963,196 A | 10/1999 | Nishiumi et al. | |
| 5,986,638 A | 11/1999 | Cheng | |
| 6,017,273 A | 1/2000 | Pelkey | |
| 6,031,222 A | 2/2000 | Carapelli | |
| 6,078,311 A | 6/2000 | Pelkey | |
| 6,078,876 A | 6/2000 | Rosenberg et al. | |
| 6,097,499 A | 8/2000 | Casey et al. | |
| 6,097,964 A | 8/2000 | Nuovo et al. | |
| 6,104,379 A | 8/2000 | Petrich et al. | |
| 6,183,364 B1 | 2/2001 | Trovato | |
| 6,192,432 B1 | 2/2001 | Slivka et al. | |
| 6,241,574 B1 | 6/2001 | Helbing | |
| 6,259,433 B1 | 7/2001 | Meyers | |
| 6,280,327 B1 | 8/2001 | Leifer et al. | |
| 6,293,798 B1 | 9/2001 | Boyle et al. | |
| 6,295,608 B1 | 9/2001 | Parkes et al. | |
| 6,300,038 B1 | 10/2001 | Shimazu et al. | |
| 6,349,301 B1 | 2/2002 | Mitchell et al. | |
| 6,418,329 B1 | 7/2002 | Furuya | |
| 6,546,390 B1 | 4/2003 | Pollack et al. | |
| 6,633,224 B1 | 10/2003 | Hishida et al. | |
| 6,760,751 B1 | 7/2004 | Hachiya et al. | |
| 6,965,868 B1 | 11/2005 | Bednarek | |
| 7,331,868 B2 | 2/2008 | Beaulieu et al. | |
| 7,336,260 B2 | 2/2008 | Martin et al. | |
| 7,649,522 B2 * | 1/2010 | Chen et al. | 345/156 |
| 7,652,660 B2 * | 1/2010 | Chen et al. | 345/156 |
| 7,825,903 B2 | 11/2010 | Anastas et al. | |
| 2001/0018354 A1 | 8/2001 | Pigni | |
| 2001/0045978 A1 | 11/2001 | McConnell et al. | |
| 2002/0072674 A1 | 6/2002 | Criton et al. | |
| 2003/0043206 A1 | 3/2003 | Duarte | |
| 2003/0058265 A1 | 3/2003 | Robinson | |
| 2003/0112269 A1 | 6/2003 | Lentz et al. | |
| 2004/0075676 A1 | 4/2004 | Rosenberg | |
| 2004/0076444 A1 | 4/2004 | Badovinac et al. | |
| 2004/0193393 A1 | 9/2004 | Keane | |
| 2005/0057528 A1 | 3/2005 | Kleen | |
| 2005/0187747 A1 | 8/2005 | Paxson et al. | |
| 2006/0109256 A1 | 5/2006 | Grant et al. | |
| 2009/0191946 A1 * | 7/2009 | Thomas et al. | 463/20 |
| 2010/0113140 A1 * | 5/2010 | Kelly et al. | 463/25 |
| 2010/0124962 A1 * | 5/2010 | Chudek et al. | 463/13 |
| 2011/0111839 A1 * | 5/2011 | Lesley et al. | 463/25 |
| 2011/0275432 A1 * | 11/2011 | Lutnick et al. | 463/25 |

FOREIGN PATENT DOCUMENTS

| | | |
|---|---|---|
| EP | 0 470 257 A1 | 2/1992 |
| EP | 0 358 989 B1 | 7/1994 |
| EP | 0 875 819 B1 | 10/2002 |
| GB | 2 237 160 A | 4/1991 |
| GB | 2 347 199 A | 8/2000 |
| WO | WO 96/16397 | 5/1996 |
| WO | WO 96/24398 | 8/1996 |
| WO | WO 96/32679 | 10/1996 |
| WO | WO 00/77689 A1 | 12/2000 |
| WO | WO 01/00630 A1 | 1/2001 |
| WO | WO 01/67297 A1 | 9/2001 |
| WO | WO 03/000319 A1 | 1/2003 |

OTHER PUBLICATIONS

NPA International Inc., U.S. Office of China Sinda Intellectual Property LTD., First Office Action, Application No. 200780034087, mailed May 5, 2010.

Patent Cooperation Treaty, International Search Report, International Application No. PCT/US2007/019986, mailed May 7, 2008.

Adelstein, B., A Virtual Environment System for the Study of Human Arm Tremor, Submitted to the Dept. of Mechanical Engineering in partial fulfillment of the requirements for the degree of Doctor of Philosophy at the Massachusetts Institute of Technology, Jun. 1989, pp. 1-253.

Adelstein, B. et al., Design and Implementation of a Force Reflecting Manipulandum for Manual Control Research, DSC-vol. 42, Advances in Robotics, ASME 1992, pp. 1-12.

Akamatsu et al., Multimodal Mouse: A Mouse-Type Device with Tactile and Force Display, Presence, vol. 3, No. 1 pp. 73-80, 1994.

ATIP98.059: Virtual Reality (VR) Development at SERI (Korea), Asian Technology Information Program (ATIP) Jul. 20, 1998, pp. 1-9.

Aukstakalnis, S. et al., The Art and Science of Virtual Reality Silicon Mirage, 1992, Peachpit Press, Inc., Berkeley, CA, pp. 129-180.

Baigrie, S. et al., Electric Control Loading-A Low Cost, High Performance Alternative, Proceedings, Nov. 6-8, 1990, pp. 247-254.

Bejczy, A., Sensors, Controls, and Man-Machine Interface for Advanced Teleoperation, Science, vol. 208, No. 4450, 1980, pp. 1327-1335.

Bejczy, A. et al., Kinesthetic Coupling Between Operator and Remote Manipulator, International Computer Technology Conference, The American Society of Mechanical Engineers, San Francisco, CA, Aug. 12-15, 1980, pp. 1-9.

Bejczy, A. et al., A Laboratory Breadboard System for Dual-Arm Teleoperation, SOAR '89 Workshop, JSC, Houston, Jul. 25-27, 1989.

Brooks, T. et al., Hand Controllers for Teleoperation: A State-of-the-Art Technology Survey and Evaluation, 1985, NASA Jet Propulsion Laboratory, California Institute of Technology, Pasadena, CA.

Burdea, G. et al., Distributed Virtual Force Feedback, IEEE Workshop on "Force Display in Virtual Environments and its Application to Robotic Teleoperation," May 2, 1993, Atlanta, GA.

Calder, B. et al., Design of a Force-Feedback Touch-Inducing Actuator for Teleoperator Robot Control, Submitted to the Department of Mechanical Engineering and Electrical Engineering in partial Fulfillment of the requirements of the degree of Bachelors of Science in Mechanical Engineering and Bachelor of Science in Electrical Engineering at the Massachusetts Institute of Technology, May 1983.

Caldwell, D. et al., Enhanced Tactile Feedback (Tele-Taction) using a Multi-Functional Sensory System, Dept. of Electronic Eng., University of Salford, Salford, M5 4WT, UK, 1993.

Cyberman Technical Specification, Logitech Cyberman SWIFT Supplement, Revision 1.0, Apr. 5, 1994, pp. 1-29.

Eberhardt, S. et al., OMAR-A Haptic Display for Speech Perception by Deaf and Deaf-Blind Individuals, IEEE Virtual Reality Annual International Symposium, Sep. 18-22, 1993, Seattle Washington.

Eberhardt, S. et al., Inducing Dynamic Haptic Perception by the Hand: System Description and Some Results, Dynamic Systems and Control, 1994, vol. 1, presented at 1994 International Mechanical Engineering Congress and Exposition, Chicago Illinois, Nov. 6-11, 1994.

Gobel, M. et al., Tactile Feedback Applied to Computer Mice, International Journal of Human-Computer Interaction, vol. 7, No. 1, pp. 1-24, 1995.

Hansen, W., Enhancing Docuemtns with Embedded Programs: How Ness extends Insets in the Andrew Toolkit, 1990, Information Technology Center, Carnegie Mellon University, Pittsburgh, PA 15213.

Hasser, C. et al., Tactile Feedback with Adaptive Controller for a Force-Reflecting Haptic Display Part 1: Design, 1996, Armstrong Laboratory, Human Systems Center, Air Force Materiel Command, Wright-Patterson AFB OH 45433.

Hasser, C. et al., Tactile Feedback for a Force-Reflecting Haptic Display, Thesis Submitted to the School of Engineering of the University of Daytona, Dayton OH, Dec. 1995.

Hasser, C., Force-Reflecting Anthropomorphic Hand Masters, Crew Systems Directorate Biodynamics and Biocommunications Division, Wright-Patterson AFB OH 45433-7901, Jul. 1995, Interim Report for the Period Jun. 1991-Jul. 1995.

Hinckley, K. et al., Haptic Issues for Virtual Manipulation, A Dissertation presented to the Faculty of the School of Engineering and Applied Science at the University of Virginia, in Partial Fulfillment of the Requirement for the Degree Doctor of Philosophy (Computer Science), Dec. 1996.

Howe, R., A Force-Reflecting Teleoperated Hand System for the Study of Tactile Sensing in Precision Manipulation, Proceedings of the 1992 IEEE Conference in Robotics and Automation, Nice, France-May 1992.

Iwata, H., Pen-Based Haptic Virtual Environment, Institute of Engineering Mechanics, University of Tsukuba, Japan, 1993.

Jacobsen, S. et al., High Performance, Dextrous Telerobotic Manipulator with Force Reflection, Intervention/ROV '91, Conference & Exposition, May 21-23, 1991, Hollywood, FL.

Jones, L. et al., A Perceptual Analysis of Stiffness, Experimental Brain Research, 1990, vol. 79, pp. 150-156.

Kelley, A. et al., MagicMouse: Tactile and Kinesthetic Feedback in the Human-Computer Interface using an Electromagnetically Actuated Input/Output Device, Department of Electrical Engineering, University of British Columbia, Canada, Oct. 19, 1993.

Lake, S.L., Cyberman from Logitech, web site at http://www.ibiblio.org/GameBytes/issue21/greviews/cyberman/html, as available via the Internet and printed May 29, 2002.

MacLean, K., Designing with Haptic Feedback, Interval Research Corporation, 1801 Page Mill Road, Palo Alto, CA 94304, 2000.

Mine, M., Isaac: A Virtual Environment Tool for the Interactive Construction of Virtual Worlds, Department of Computer Science, University of North Carolina Chapel Hill, 1995.

Picinbono, G. et al., Extrapolation: A Solution for Force Feedback, Virtual Reality and Prototyping, Jun. 1999, Laval, France.

Wloka, M., Interacting with Virtual Reality, Science and Technology Center for Computer Graphics and Scientific Visualization, Brown University Site, Department of Computer Science, 1995.

Real Time Graphics, The Newsletter of Virtual Environment Technologies and Markets, Aug. 1998, vol. 7, No. 2.

1998 IEEE International Conference on Robotics and Automation, May 16-20, 1998, Lueven, Belgium.

Bejczy, A. et al., Universal Computer Control System (UCCS) for Space Telerobots, Jet Propulsion Laboratory, California Institute of Technology, Pasadena, CA, pp. 317-324, 1987.

Bjork, S. et al., An Alternative to Scroll Bars on Small Screens, Play: Applied Research on Art and Technology, Viktoria Institute, Box 620, SE-405 30 Gothenburg, Sweden, pp. 1-2, 1999.

Bouguila, et al., Effect of coupling haptics and stereopsis on depth perception in virtual environment. Proceedings of the Workshop on Haptic Human-Computer Interaction; Aug. 31-Sep. 1, 2000; Glasgow, Scotland. Germany: Springer Berlin/Heidelberg; 2001. p. 54-62 2000, web page at www.dcs.gla.ac.uk/~stephen/workshops/haptic/papers/bougilia-paper.pdf, as available via the Internet.

Fukumoto, M. et al., Active Click: Tactile Feedback for Touch Panels, NTT DoCoMo Multimedia Labs, Japan, Apr. 2001, pp. 121-122.

Gotow, J. et al., Controlled Impedance Test Apparatus for Studying Human Interpretation of Kinesthetic Feedback, The Robotics Institute and Deptartmetn of Mechanical Engineering, Carnegie Mellon University, Pittsburgh, PA 15213, pp. 332-337, 1989.

Johnson, A., Shape-Memory Alloy Tactical Feedback Actuator, Phase I-Final Report, Air Force SABIR Contract F33-88-C-0541, Armstrong Aerospace Medical Research Laboratory, Human Systems Division, Air Force Systems Command, Wright-Patterson Air Force Base, OH 45433,. 1990.

Kaczmarek, K. et al., Tactile Displays, Virtual Environment Technologies, pp. 349-414, 1995.

eRENA, Deliverable 7b.1, Pushing Mixed Reality Boundaries, 1999, web page at www.nada.kth.se/erena/pdf/D7b_1.pdf, as available via the Internet.

The State Intellectual Property Office of the Peoples Republic of China, Second Office Action, Application No. 200780034087, issued Jun. 2, 2011.

* cited by examiner

US 8,157,650 B2

SYSTEMS AND METHODS FOR CASINO GAMING HAPTICS

CROSS-REFERENCES TO RELATED APPLICATION

This application claims priority to U.S. Provisional Patent Application No. 60/844,316 entitled "Casino Gaming Haptics," filed Sep. 13, 2006, the entirety of which is hereby incorporated by reference.

FIELD OF THE INVENTION

The present invention generally relates to haptic gaming devices. The present invention more specifically relates to systems and methods for casino gaming haptics.

BACKGROUND

Guests at a casino are typically able to play electronic casino games, such as video poker games. The electronic game presents a user with an image showing a poker hand, for example. The user is able to bet chips, select cards to discard, and to draw additional cards. The game then awards credits to the user based on the strength of the user's hand. Other games of chance may be played on similar machines, such as other card games, dice games, slot machines, roulette, or other virtual gaming implements. For example, a video slot machine may allow a user to select a number of rows to bet, a number of credits to wager, and pull a virtual lever to start the random selection of icons to be displayed in three windows. When the wheels have come to a rest, the user may be awarded credits based upon the combination of icons presented in the windows.

While conventional casino gaming machines may provide feedback to a user in the form of visual displays on a screen, or with sounds, conventional casino gaming machines do not provide haptic feedback to a user. Such feedback may provide a more immersive or enjoyable gaming experience, and may encourage the user to play a haptically-enabled game machine instead of a conventional game machine.

SUMMARY

Embodiments of the present invention comprise systems and methods for casino gaming haptics. For example, in one embodiment, a system for casino gaming haptics comprises a touch-sensitive input device configured to sense a contact from a user; an actuator coupled to the touch-sensitive input device, the actuator configured to output a haptic effect to the touch-sensitive input device; and a processor in communication with the touch-sensitive input device and the actuator, the processor configured to: generate a display signal configured to cause an image associated with a casino game to be displayed; receive an input signal from the touch-sensitive input device associated with the contact; determine an interaction between the contact and the image; and generate an actuator signal associated with the interaction, the actuator signal configured to cause the actuator to generate a haptic effect. In another embodiment, a computer-readable media comprises code for a carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for casino gaming haptics. Methods, systems and products according to the present invention may be embodied in a number of ways.

Illustrative Casino Gaming Haptics

Figure 1:
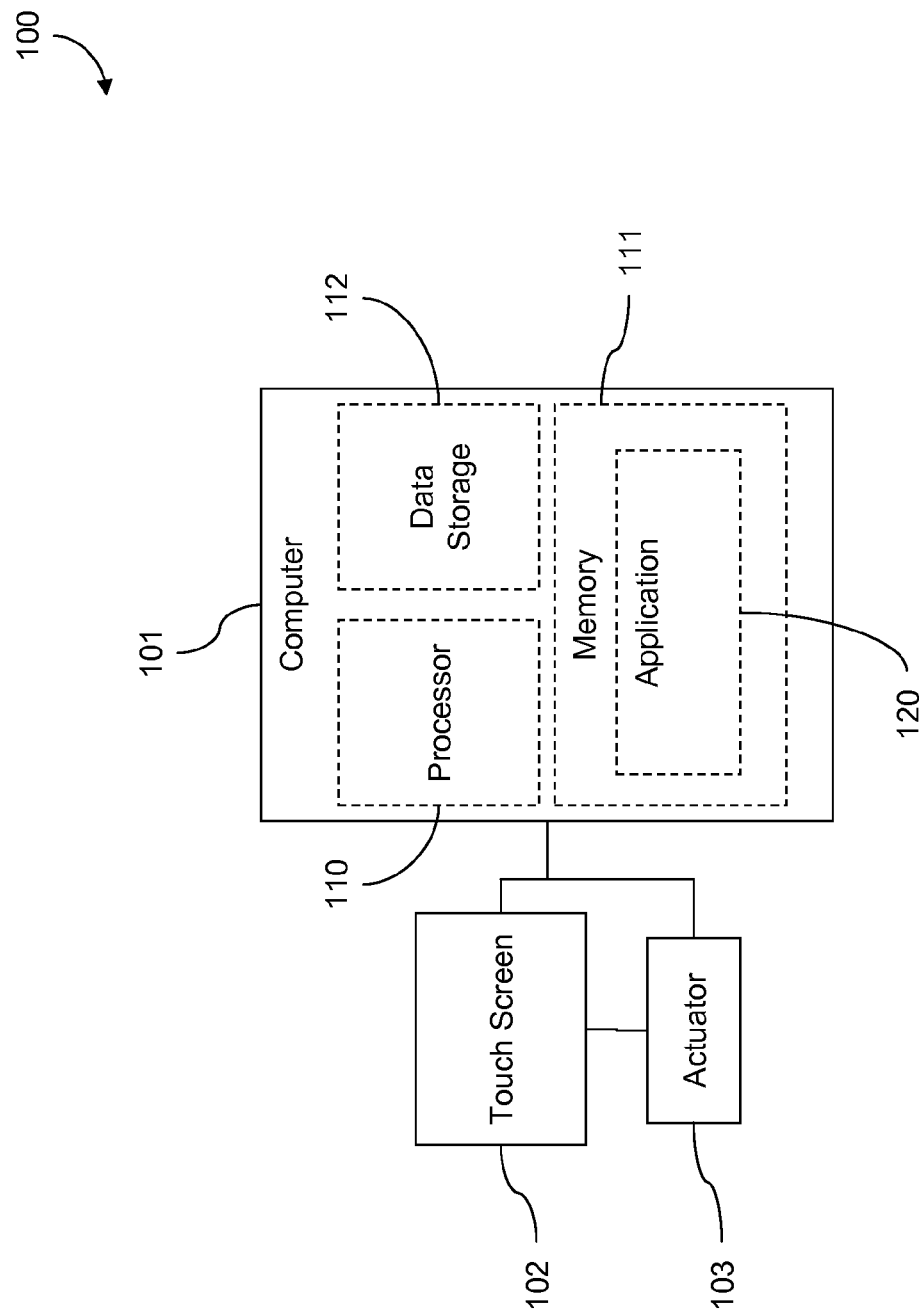
FIG. 1 is a block diagram illustrating a system for casino gaming haptics according to one embodiment of the present invention.

FIG. 1 is a block diagram illustrating a system for casino gaming haptics according to one embodiment of the present invention. In the illustrative embodiment shown in FIG. 1, a system 100 for casino gaming haptics comprises a computer 101, a touch screen 102, and an actuator 103 in communication with the computer 101 and the touch screen 102. Computer 101 also comprises a computer-readable medium, such as a memory 111. Computer 101 comprises a processor 110 configured to load an application 120 from storage 112 into memory 111. In this illustrative embodiment, application 120 is a casino gaming application configured to allow a user to play five-card draw poker.

Figure 2:
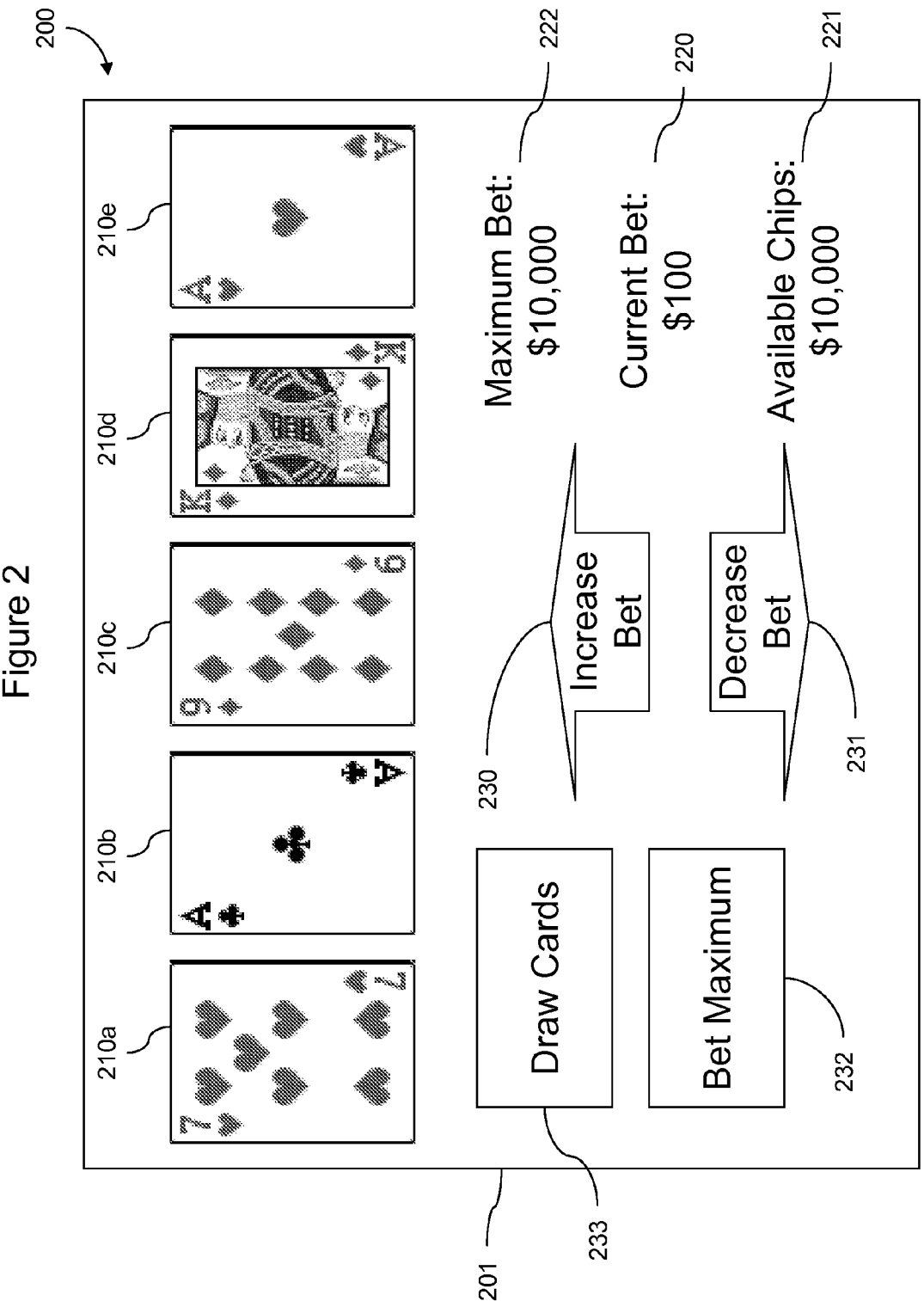
FIG. 2 is a simulated screenshot of images associated with a casino game application executed by a system for casino gaming haptics according to one embodiment of the present invention.

FIG. 2 is a simulated screenshot of images associated with a casino game application executed by a system for casino gaming haptics according to one embodiment of the present invention. The embodiment shown in FIG. 2 will be described in relation to the system shown in FIG. 1. The touch screen 102 displays the five-card draw poker game 201 as shown in FIG. 2. The game 201 shows the five cards 210a-e dealt to the player, the current bet 220, the number of chips 221 the player has, buttons 230, 231 to allow the user to increase or decrease the wager, a button 232 to place the maximum wager 222, and a button 233 to draw cards to replace any the player wishes to discard. A user may select one or more cards 210a-e to keep or to discard, or interact with one or more of the buttons 230-233 to play the game 201. For example, the player may choose to discard the seven of hearts 210a and nine of diamonds 210c by touching the cards on the touch screen 102. The user may then increase his bet by pressing the "Increase Bet" button 230, and draw two new cards by pressing button 233.

In the embodiment shown, as the player interacts with the touch screen 102, such as to select cards 230a-e to discard, change the bet 230-232, or to choose to draw new cards 233, the system 100 provides haptic feedback to the player. The actuator 103 is in communication with the touch screen 102 and may be commanded by the computer 101 to output haptic effects to the touch screen 102. For example, when the player touches a card 230a to be discarded, the actuator 103 may generate a haptic effect, such as a short duration high frequency vibration (which may be referred to as a "pop"), to indicate that the card 230a has been selected. Pops and other well-known haptic effects will not be described in detail as they are known to one of ordinary skill in the art. The actuator 103 may also output haptic effects corresponding to other actions, such as betting changes, or when the player chooses to draw cards.

Additionally, the system 100 may output haptic effects in response to events that occur in the game. For example, the system may output a haptic effect when new cards are dealt, or if the player has the winning hand.

This illustrative example is given to introduce the reader to the general subject matter discussed herein. The invention is not limited to this example. Further details regarding various embodiments of systems and methods for casino gaming haptics are described below.

System for Casino Gaming Haptics

Figure 3:
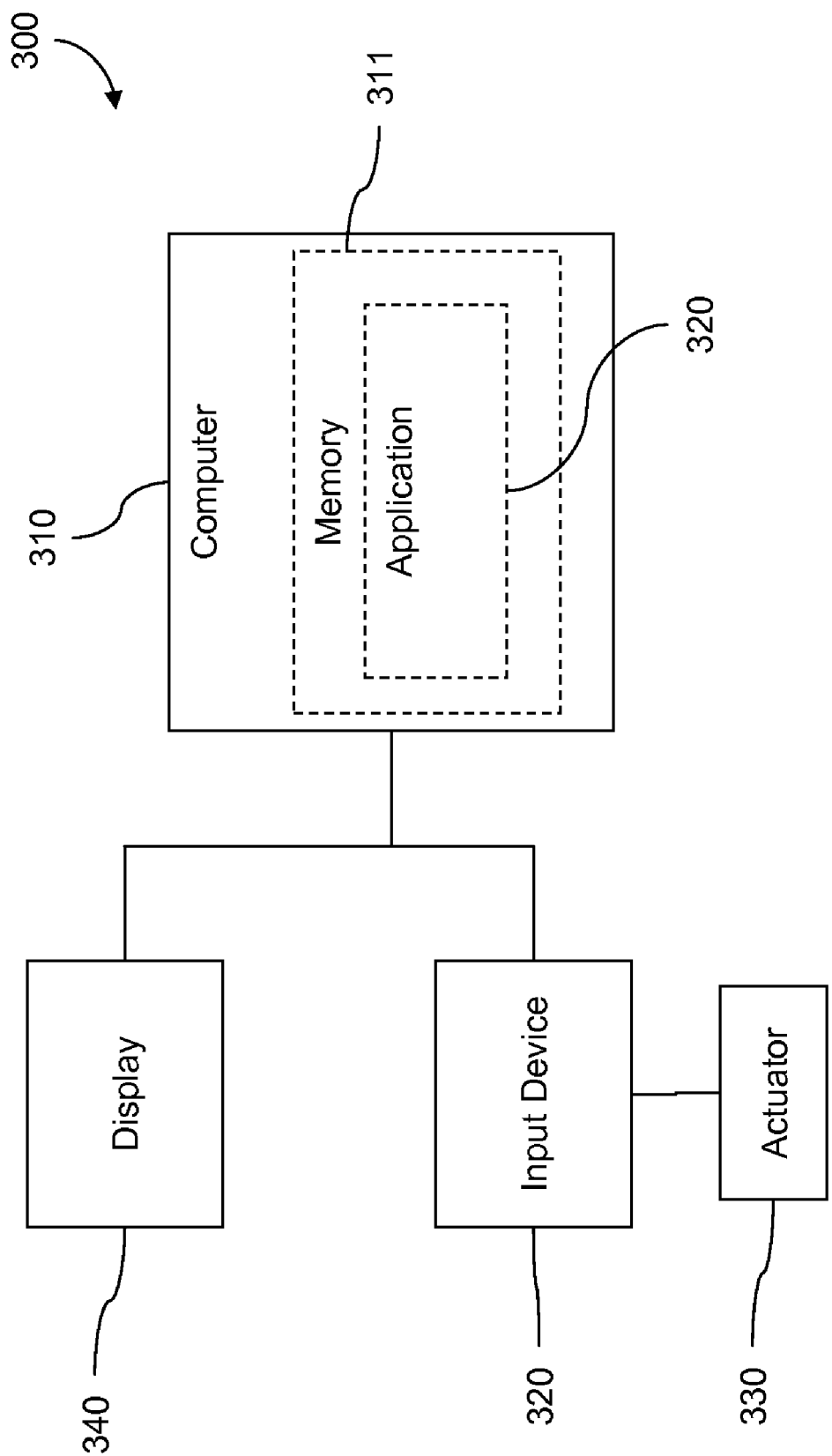
FIG. 3 is a block diagram illustrating a system for casino gaming haptics according to one embodiment of the present invention.

FIG. 3 is a block diagram illustrating a system 300 for casino gaming haptics according to one embodiment of the present invention. In the embodiment shown in FIG. 3, system 300 comprises a computer 310 or other processor-based device, a touch-sensitive input device 320 in communication with the computer 310 and an actuator 330, and a display 340 in communication with the computer 310.

Computer 310 comprises a processor (not shown), memory 311, or other computer-readable medium, and is configured to load application 312 from storage, such as from a hard drive or other computer-readable medium, and execute application 312. Computer 310 is in communication with an input device 320, an actuator 330, and a display 340, and is configured to generate a display signal configured to cause an image associated with a casino game to be displayed, and to transmit the display signal to display device 340. The computer 310 is further configured to receive an input signal from the touch-sensitive input device 320, such as from a user making contact with the touch-sensitive input device, and to determine an interaction between the contact and the image.

For example, in one embodiment of the present invention, a casino game, such as can be seen in FIG. 2, may be displayed by display 340. A user may touch a touch-sensitive input device, such as a touch screen 320, at a location to indicate that a card should be selected. The computer 310 receives an input signal from the touch-screen 320. The input signal indicates that the user has touched the touch screen 320. In one embodiment of the present invention, the input signal comprises a coordinate describing the location of the contact. The computer 310 then determines an interaction between the contact and the image. For example, in one embodiment of the present invention, the computer 310 determines whether the location of the contact falls within the boundaries of an object displayed on the screen, such as a playing card.

Computer 310 is further configured to generate an actuator signal associated with the interaction, the actuator signal configured to cause the actuator 330 to generate a haptic effect. For example, in one embodiment of the present invention, a user may contact the touch screen 320 at a location corresponding to a playing card. The computer 310 determines there is an interaction between the contact and the image of the playing card. The computer 310 then generates a haptic effect, such as a vibration, and encodes the haptic effect within an actuator signal. The computer 310 then transmits the actuator signal. For example, in one embodiment of the present invention, the computer 310 transmits the actuator signal to the input device 320. In such an embodiment, the input device 320 may then send a signal to the actuator 330 to generate the haptic effect. In one embodiment of the present invention, the computer 310 transmits the actuator signal directly to the actuator 330.

In the embodiment shown in FIG. 3, input device 320 comprises a touch-sensitive input device configured to sense a contact from a user. For example, in one embodiment, input device 320 comprises a touch screen. In the embodiment shown in FIG. 3, the touch screen comprises the display 340 and the touch-sensitive input device 320 which is overlaid on the display 340. In other embodiments of the present invention, the touch-sensitive input device 320 may not be overlaid on the display 340. In one embodiment of the present invention, input device 320 comprises a non-touch-sensitive input device, such as a keyboard or keypad. Other embodiments of the present invention may comprise other non-touch-sensitive input devices such as buttons, knobs, dials, switches, levers, trackballs, or other suitable manipulanda. For example, an embodiment of the present invention for playing a slot machine may comprise a lever.

The actuator 330 shown in FIG. 3 is in communication with the input device 320 and computer 310. In one embodiment, the actuator 330 may be in communication with a housing a device and may be configured to output haptic effects to the housing as well as the input device. Any suitable actuator may be used in embodiments of the present invention. Further embodiments of the present invention may comprise a plurality of actuators. In various embodiments of the present invention, actuators can comprise either active or passive actuators.

Active actuators include, for example, linear current control motors, stepper motors, pneumatic/hydraulic active actuators, piezoelectric actuators, eccentric rotating masses, and other types of actuators that transmit a force to move an object or to provide a vibrotactile effect. For example, active actuators can drive a rotational shaft about an axis in a rotary degree of freedom, or drive a linear shaft along a linear degree of freedom. Active transducers of embodiments of the present invention may be bi-directional, meaning they can selectively transmit force along either direction of a degree of freedom. For example, DC servo motors can receive force control signals to control the direction and torque (force output) that is produced on a shaft. The motors may also include one or more brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), a voice coil actuator, or other active actuators known to those skilled in the art. Alternatively, or in addition, other active actuators such as piezo-electric, shape memory alloy, or electro-active polymers may be used as well.

Passive actuators can also be used for actuator 330. Magnetic particle brakes, friction brakes, or pneumatic/hydraulic passive actuators can be used in addition to or instead of an active actuator to generate a damping resistance, a vibrotactile effect, or friction in a degree of motion.

In some embodiments of the present invention, an input device 320 may integrally incorporate an actuator within the input device 320. Such an input device 320 may comprise one or more actuators configured to output haptic effects. Such input devices are referred to herein as "haptically-enabled." In some embodiments of the present invention, an input device 320 may not comprise an actuator. In such an embodiment, haptic effects maybe output to the input device 320 indirectly, such as by an actuator in communication with a housing of the input device.

Display 340 comprises a device capable of receiving a display signal from a computer or processor-based device and displaying an image to a user. For example, in one embodiment of the present invention, display 340 comprises a liquid-crystal display (LCD). In one embodiment of the present invention, display comprises 340 a cathode-ray tube (CRT) monitor or an organic light-emitting diode (OLED) display. In some embodiments of the present invention, display 340 may comprise a plurality of displays. For example, in one embodiment of the present invention, a system for casino gaming haptics comprises a slot machine. In such an embodiment, display 340 may comprise three displays, where each display simulates one of the three wheels of a conventional slot machine.

Figure 4:
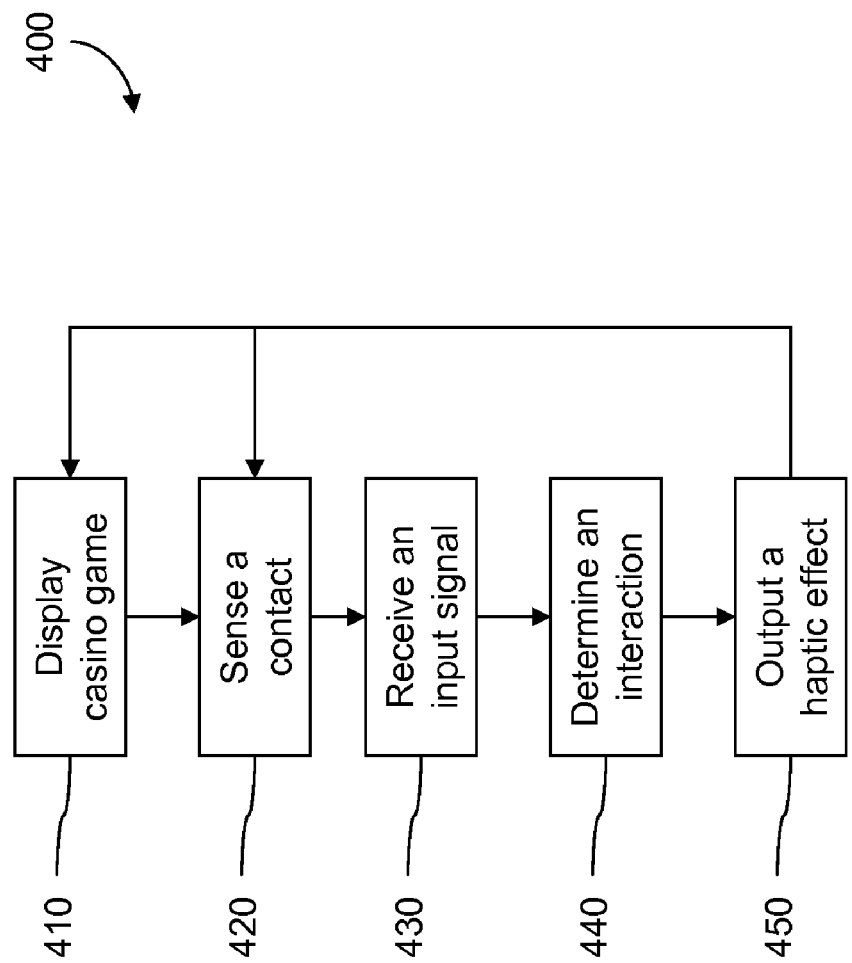
FIG. 4 is a flow chart illustrating a method for providing casino gaming haptics according to one embodiment of the present invention.

FIG. 4 shows a method 400 for providing casino gaming haptics according to one embodiment of the present invention. The description of the method 400 will be made with reference to the system 300 shown in FIG. 3.

In block 410, a system 300 displays an image associated with a casino game. For example, in one embodiment of the present invention, system 300 displays an image associated with a casino game on display 340. In another embodiment of the present invention, a system for casino gaming haptics transmits a signal to a remote device to cause the device to display an image associated with casino game. For example, a server may transmit a signal to a remote computer to cause the remote computer to display an image associated with a casino game.

In block 420, a touch-sensitive input device 320 senses a contact with the touch-sensitive input device 320, the contact associated with the image or a portion of the image. For example, in one embodiment of the present invention, a user contacts a touchscreen at a location associated with a displayed playing card, and the touchscreen senses the contact.

In block 430, a computer 310 receives an input signal from the touch-sensitive input device 320, the input signal associated with the contact. For example, in one embodiment of the present invention, after the touch-sensitive input device 320 senses a location of a contact, the touch-sensitive input device 320 transmits a signal to the computer 310, which receives the input signal from the touch-sensitive device 320, the input signal associated with the contact.

In block 440, the system 300 determines an interaction between the contact and the image. For example, in one embodiment of the present invention, the computer 310, compares the location of the contact with the location of an image of the playing card displayed on the display 340. If the location of the contact overlaps with the location of the image, or contacts or is within a boundary of the image, the system 300 determines that the contact interacted with the image. A user may contact a location of an image in different ways. For example, in one embodiment of the present invention, the system 300 may determine that a user has touched the image. In one embodiment of the present invention the system 300 may determine that the user has slid a finger across the image, tapped the image, or has flipped the image over.

In block 450, the system 300 outputs a haptic effect based at least in part on the interaction. For example, in one embodiment of the present invention, the computer 310 transmits an actuator signal to the actuator 330, the actuator signal configured to cause the actuator to output a haptic effect. In another embodiment of the present invention, the computer 310 transmits an actuator signal to the input device 320. The input device 320 then causes the actuator to output a haptic effect.

Figure 5:
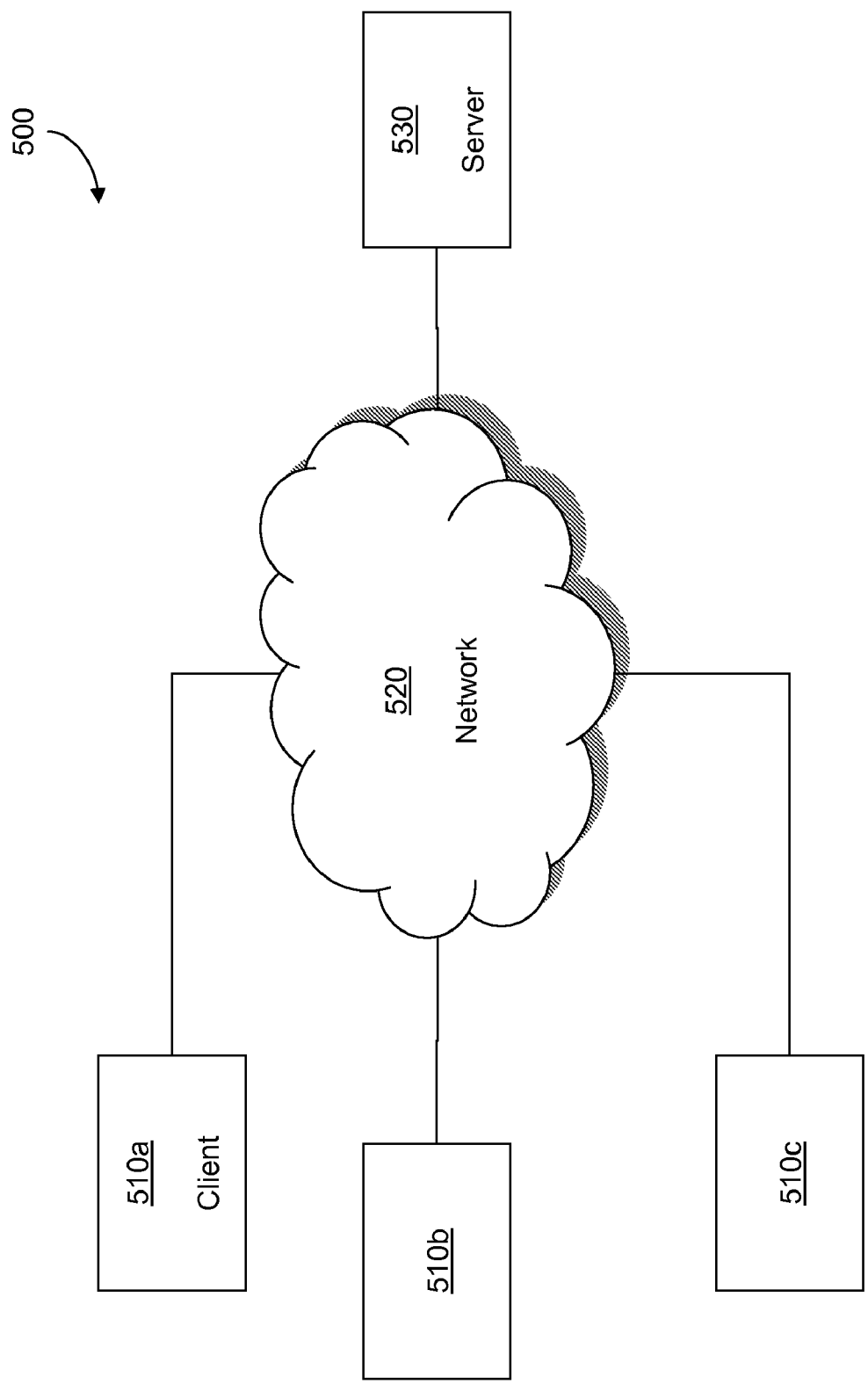
FIG. 5 is a block diagram illustrating a system for casino gaming haptics according to one embodiment of the present invention.

Referring now to FIG. 5, FIG. 5 is a block diagram illustrating a system for casino gaming haptics according to one embodiment of the present invention. The networked system 500 comprises a plurality of client systems 510, a network 520, and at least one server 530. Client systems are in communication with the network and server. In addition, clients 510 may be in communication with each other.

In the embodiment shown in FIG. 5, server 530 comprises a computer or other processor-based device. The server 530 further comprises a computer-readable medium, such as a hard drive, on which is stored one or more casino game applications. Server 530 is configured to communicate with one or more client systems 510 over network 520.

In the embodiment shown in FIG. 5, client systems 510 each comprise a system, such as system 300 shown in FIG. 3. However, in other embodiments of the present invention, client systems 510a-c may comprise other computer systems. For example, in one embodiment of the present invention client system 510a comprises a thin client device. A thin client device comprises an input device, such as a touchscreen, a processor, a network interface, and a computer-readable medium. For example, in one embodiment, thin client device may comprise an integral unit having a housing, a touchscreen, a processor, a computer-readable memory, and an interface for communication with the network 520. The input device is in communication with an actuator configured to output haptic effects to the input device. While a thin client device comprises a computer-readable medium, it may or may not have a non-volatile computer-readable medium, such as a hard drive. Such a thin client device may be configured to communicate with the server 530 to download a casino gaming application stored on the server 530 into the thin client's computer-readable medium, such as RAM. In addition, the thin client device may be able to download haptic effect information. For example, the thin client may download an application to allow a user to play craps. The thin client may also download haptic information that includes data for generating haptic effects, such as for shaking and rolling dice.

Once the application and the haptic information have been downloaded, the thin client device may allow a user to play one or more haptic casino games. Such an embodiment may allow a casino or other establishment to install a plurality of relatively inexpensive thin client devices on its premises, and use a fewer number of servers 530, which are typically more expensive.

Embodiments of the present invention may comprise a network 520. Any suitable network may be employed that will allow data transfer between a client 510 and a server 530. Some embodiments of the present invention may allow two clients 510 to communicate, such as to play an interactive casino game with users at other clients 510, like poker. A suitable network may comprise any suitable communications link, including a circuit; Ethernet; a token ring network; a wireless communications link including but not limited to 802.11 wireless Ethernet, Bluetooth; a system bus; USB; or FireWire.

Figure 6:
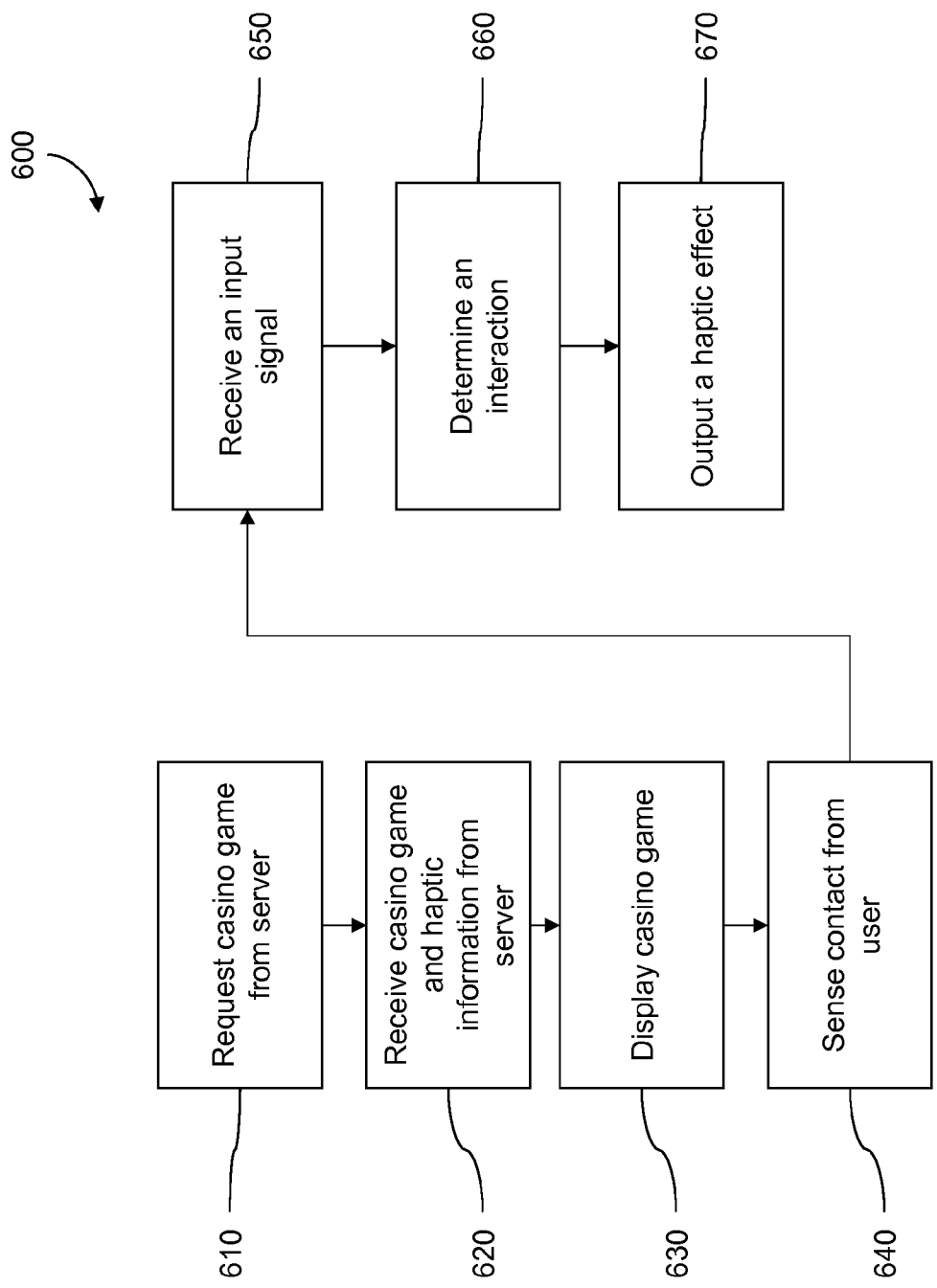
FIG. 6 is a flow chart illustrating a method for providing casino gaming haptics according to one embodiment of the present invention.

Referring now to FIG. 6, which shows a method 600 for casino gaming haptics according to one embodiment of the present invention. The description of the method 600 will be made with reference to the system 500 shown in FIG. 5.

In block 610, a client 510 requests a casino game from a server 530. For example, in one embodiment of the present invention, a client 510 may comprise a thin client. The client 510 may transmit a request over a network 520 to the server 530, where the request specifies a game a user has selected to play. In another embodiment, the client 510 may transmit a request over a network 520 to the server 530, where the request is sent after the client 510 powers up, and specifies one or more games the client 510 is authorized to play.

In response to the request sent in block 610, the server 530 determines if the requested application or applications are available. The server may also require authentication from the client device, such as an access code, a password, or other identification or authentication device in order to prevent unauthorized access to the server or the applications. If the requested applications are available, the server 530 transmits the requested applications to the client 510.

In addition to transmitting a request for a casino game application, the client 510 may transmit a request for haptic information. For example, in one embodiment of the present invention, the client 510 may request haptic information associated with the casino game application.

In one embodiment of the present invention, a plurality of clients 510 may be in communication and allow multiple users to participate in the same game, such as in a multiplayer poker game. In such an embodiment, server 502 may receive signals or messages from one or more clients 510, and may transmit signals or messages to one or more clients 510 indicating actions of the plurality of users or one or more haptic effects based on the actions of the plurality of users.

In block 620, the client 510 receives a casino game application from the server 530. After the client 510 has received the casino game application (or the "application"), the client 510 may execute the application. In one embodiment, the client 510 may receive a plurality of casino game applications. In such an embodiment, the client 510 may execute one of the applications, or it may allow a user to select one of the applications to execute.

In block 630, the client 510 displays an image associated with the casino game application. For example, in one embodiment of the present invention, a casino game application may comprise a poker game. In such an embodiment, the casino game application may display a plurality of images, such as may be seen in FIG. 2.

In block 640, a touch-sensitive input device senses a contact client, the contact associated with the image. For example, in one embodiment of the present invention, a user contacts a touchscreen at a location associated with a displayed playing card, and the touchscreen senses the contact.

In block 650, the client 510 receives an input signal from the touch-sensitive input device, the input signal associated with the contact. For example, in one embodiment of the present invention, after the touch-sensitive input device senses a contact, the touch-sensitive input device transmits a signal to the client 510, which receives the input signal from the touch-sensitive device, the input signal associated with the contact.

In block 660, the client 510 determines an interaction between the contact and the image. For example, in one embodiment of the present invention, the client 510, compares a location of the contact with the location of an image of a playing card displayed on the client's display. If the location of the contact falls within the boundary of the image, the client determines that the contact interacted with the image.

In block 670, the client 510 outputs a haptic effect based at least in past on the interaction. For example, in one embodiment of the present invention, the client 510 transmits an actuator signal to an actuator, the actuator signal configured to cause the actuator to output a haptic effect. In one embodiment of the present invention, the client 510 transmits an actuator signal to the touch-sensitive input device. The touch-sensitive input device then causes the actuator to output a haptic effect. In another embodiment of the present invention, the client 510 may transmit the actuator signal directly to an actuator.

Figure 7:
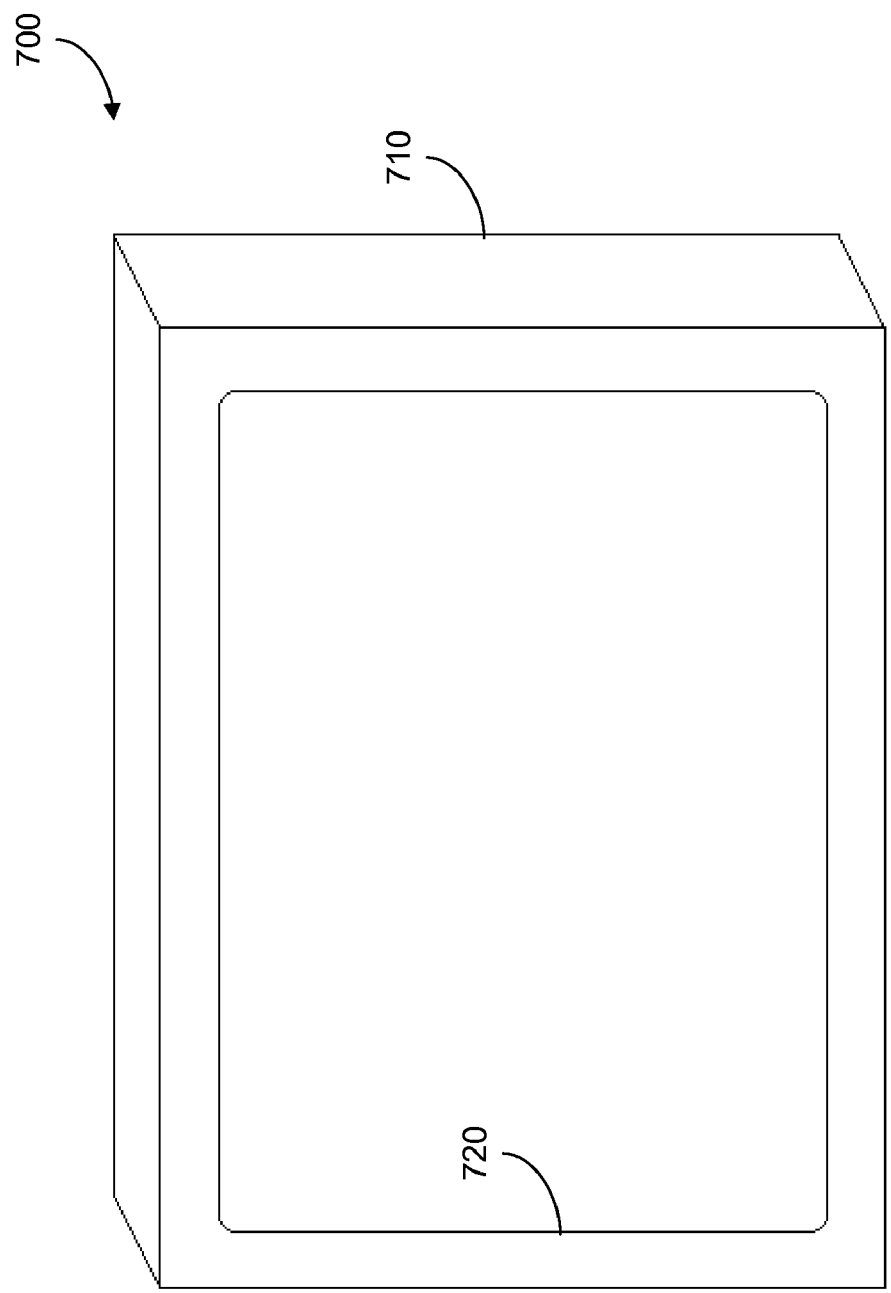
FIG. 7 shows a system 700 for self-contained casino-gaming haptics according to one embodiment of the present invention.

FIG. 7 shows a system 700 for self-contained casino-gaming haptics according to one embodiment of the present invention. The system 700 comprises a self-contained casino gaming system. The system comprises a housing 710 and a touch screen 720. The system 700 also comprises a processor (not shown, an actuator (not shown) in communication with the touch screen, and a memory (not shown). The system 700 is configured to execute an application which comprises a casino game, such as, without limitation, poker. The processor generates a display signal associated with the casino game and transmits it to the touch screen 720. The touch screen 720 displays the game to the user, and accepts inputs from the user via user contact with the touch screen 720. The touch screen 720 transmits an input signal to the processor, which determines an interaction between the contact and an image displayed on the touch screen 720. The processor generates and transmits an actuator signal associated with the interaction. The actuator receives the actuator signal and outputs a haptic effect to the touch screen.

Referring again to FIGS. 3 and 7, embodiments of the present invention can be implemented in digital electronic circuitry, or in computer hardware, firmware, software, or in combinations of them. In one embodiment, a computer may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include, such as a router, private or public network, or other transmission device. The processor, and the processing, described may be in one or more structures, and may be dispersed through one or more structures. The processor may comprise code for carrying out one or more of the methods (or parts of methods) described herein.

Games and Haptic Effects

Systems for casino gaming haptics according to embodiments of the present invention may be configured to provide one or more games for a user to play. For example, systems for casino gaming haptics may be configured to provide card games, dice games, roulette, checkers, Othello™-type games, picture match games, word games, trivia games, or other games conventionally available in casino gaming machines, or similar machines that may be commonly found in bars or other establishments.

A system for casino gaming haptics according to one embodiment of the present invention may be configured to provide haptic effects for events or options that may occur within a game. For example, in a system for casino gaming haptics according to one embodiment of the present invention that provides a roulette game, the system may be capable of generating haptic effects associated with events or actions that may occur in a conventional roulette game or electronic roulette game, such as spinning the roulette wheel, a roulette ball moving or bouncing within the roulette wheel, betting chips, pressing interface buttons, or moving chips across a felt surface. In one embodiment of the present invention, a casino gaming system may be configured to provide haptic effects for other games, such as placing bets on a virtual craps table, arranging cards on a Pai-Gow poker game, game selection for multi-game devices, selecting position and color for checkers and Othello™-type casino games, or choosing objects in bonus games, or playing other types of casino games, such as baccarat, craps, war, keno, blackjack, or slots.

Additionally, a system for casino gaming haptics according to the present invention may be capable of generating haptic effects associated with actions and events common to a plurality of games. For example, in one embodiment of the present invention, a system for casino gaming haptics may be capable of generating haptic effects corresponding to pressing a button, winning a game, losing a game, receiving chips, beginning a game, quitting a game, or other events common to two or more games.

Embodiments of the present invention provide haptic effects for actions a user may take during a game. For example, embodiments of the invention may allow a user to roll dice, deal or move playing cards, spin a roulette wheel, play a slot machine, or otherwise interact with objects associated with casino games. Such haptic effects may be employed to provide a more realistic experience for the user.

Haptic Effects Associated with Virtual Cards

Many casino games involve playing cards, including poker and blackjack. Card games may include actions such as dealing one or more cards to each player, selecting one or more cards within the player's hand, and discarding cards. Various haptic effects may be employed to provide feedback to a player interacting with a playing card. For example, in one embodiment of the present invention, if a player touches a touch screen and drags his finger towards a card, the system may generate a short, low magnitude, high frequency haptic effect when the user's finger passes over the edge of a playing card. The system may also play a continuous low magnitude, high frequency haptic effect as long as the player's finger is located over the playing card.

In addition to touching a card, a user may slide a playing card, such as to re-arrange the cards in the user's hand, or to discard the card. While the user is sliding the card, the system may provide a higher magnitude vibration to the user, to indicate that the card is being moved. Once the card has reached a potential destination, which may be denoted by an outline on the screen, the system may generate a high magnitude, high frequency effect to indicate to the user that the card may be released.

For example, in the embodiment shown in FIGS. 1 and 2, a user may touch the nine of diamonds 210c, and feel a light pop (e.g. a low magnitude, high frequency, short duration effect) to indicate that the card has been contacted. The user may then drag the card 210c to the edge of the screen 201 to discard the card. While the user is dragging the card, the system 100 may output a low magnitude, low frequency vibration to provide the tactile sensation of a card sliding across a felt surface. When the card reaches the edge of the screen, the system 100 may generate a strong pop (e.g. a high magnitude, high frequency, short duration) effect to indicate the card has been discarded. The user may then drag another card to be discarded, or select the draw cards button 233 to receive a card to replace the discarded card 210c.

Shaking Virtual Dice

Figure 8:
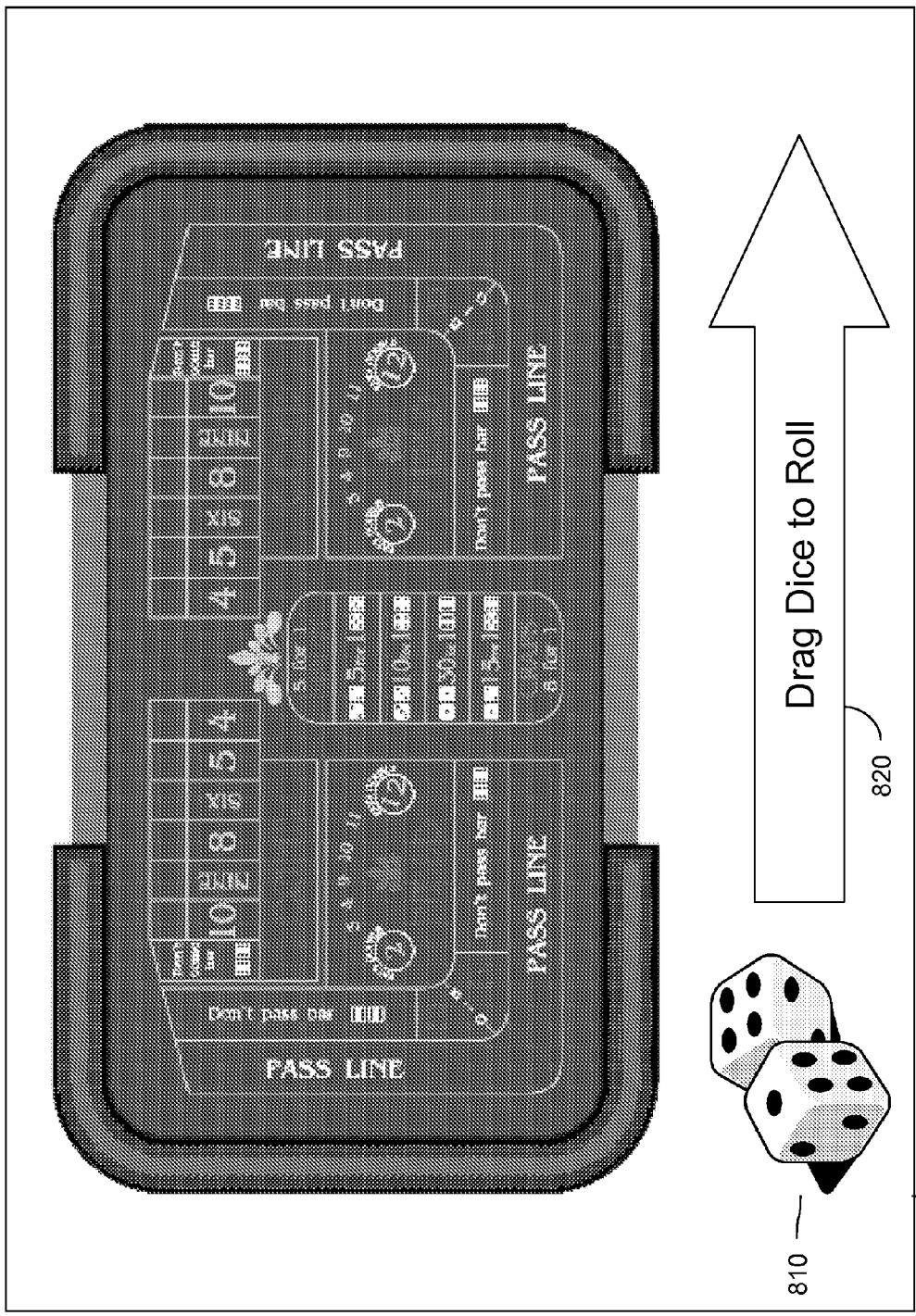
FIGS. 8-10 are simulated screenshots of images associated with a casino gaming application executed by a system for casino gaming haptics according to one embodiment of the present invention.

FIG. 8 shows a simulated screenshot of images associated with a casino gaming application executed by a system for casino gaming haptics according to one embodiment of the present invention. In the embodiment shown in FIG. 8, a casino gaming system may be configured to allow the user to play a game that includes rolling one or more dice 810. For example, a craps game may display a pair of dice 810 on a display. The user can select the dice 810 by touching the touch screen and holding his finger against the touchscreen over the dice. The user may then shake the dice 810 by moving the finger back and forth while maintaining contact with the touchscreen. A computer executing the gaming application receives an input signal from the touchscreen indicating that the user's contact with the screen is changing. The computer determines that the user is shaking the dice, and generates an actuator signal associated with the user's action.

In the embodiment of the present invention shown in FIG. 8, a user rolls a pair of dice by touching an image of the dice 810 with a finger, dragging 820 across the screen, and lifting from the touch screen 800. The system may output a steadily increasing low frequency vibration while the use drags the dice 810 across the touch screen 800, and a pop when the system detects the force of contact with the touch screen 800 is below a threshold, which may indicate that the user is removing the finger from the touch screen 800. In a further embodiment, the touch screen 800 may display the dice 810 on the screen within a box or other bounded region. The user may move the dice within the box to "shake" them, and drag them out of the box to roll them. The system may output a vibration while the user is shaking the dice 810, and a different vibration when rolling the dice 810.

In one embodiment of the present invention, a system for casino gaming haptics may generate haptic effects to be output during the shaking action. For example, a short duration high-magnitude haptic effect may be played each time there is a direction change of the finger. The sensation produced may be similar to the feel of real dice being shaken in a closed hand or in a cup. In addition, a continuous vibration may be played while the user is shaking the dice to simulate the dice rattling while being shaken. Further, the magnitude and/or the vibration may increase or decrease based at least in part on the speed at which the user shakes the dice. Such a sensation may provide a tactile indication that the user is interacting with the dice. When the user is ready to "throw" the dice, the user may release the dice by lifting his from the touch screen, or the user may move the dice out of a graphical region displayed on the screen. In another embodiment, the user may throw the dice by moving the dice out of a bounded area on the screen. The system may generate a different haptic effect for this throwing motion. For example, the system may generate a pop as the user throws the dice to provide a tactile response to the user. As the dice tumble to a stop, the system may output haptic effects to simulate the dice bouncing on a surface, such as a high magnitude, high frequency haptic effect for each bounce.

Virtual Roulette

Figure 9:
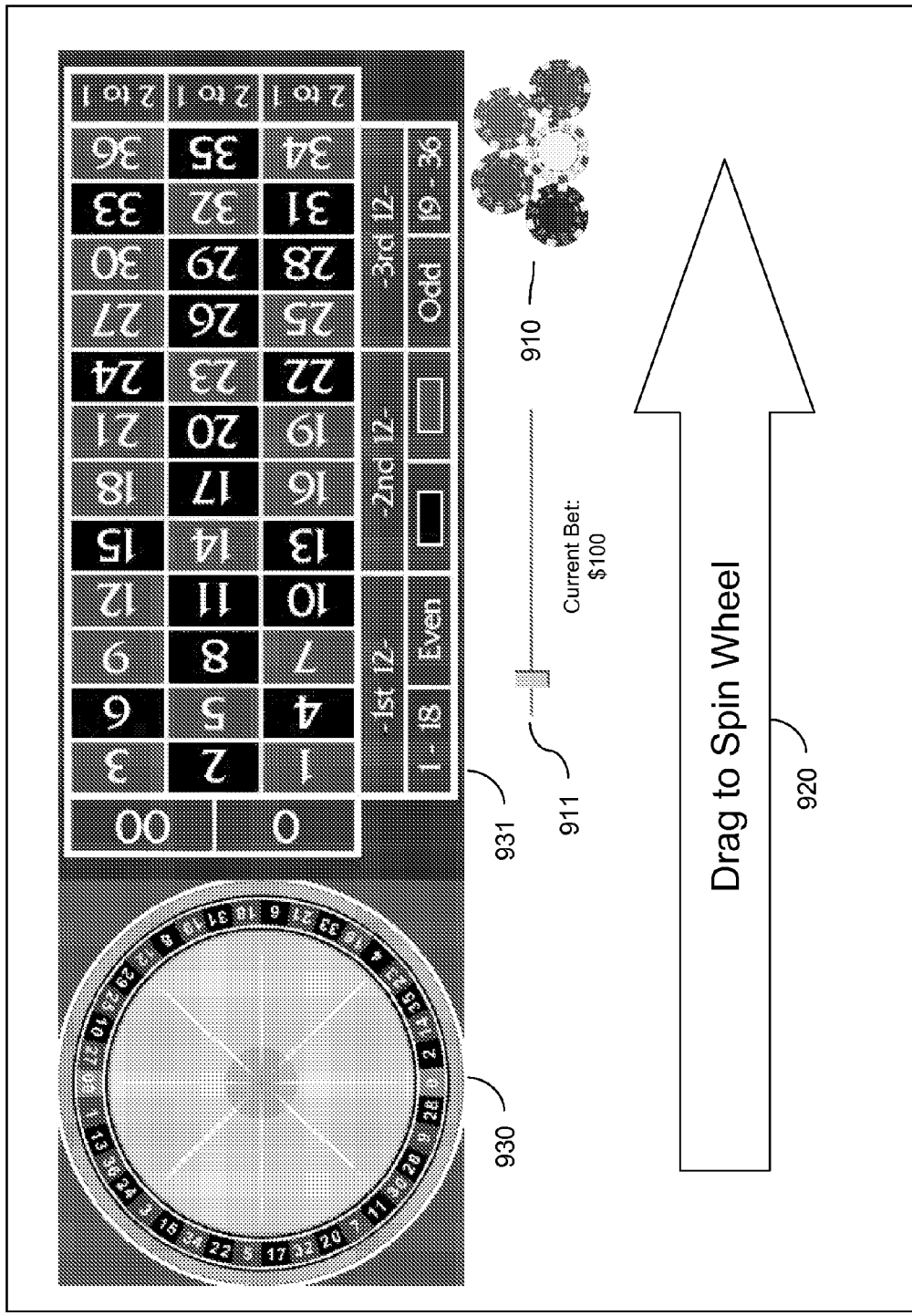

FIG. 9 shows a simulated screenshot of images associated with a casino gaming application executed by a system for casino gaming haptics according to one embodiment of the present invention. In the embodiment shown in FIG. 9, a casino gaming system may be configured to allow the user to play roulette. To play such a game, a user may spin the roulette wheel 930, which may require the user to touch a finger on the touch screen 900 and drag 920 across the screen. The gaming system may provide a low-magnitude vibration when the user touches the screen, and increase the vibration as the roulette wheel 930 increases in speed. Finally, the user may perceive a pop or jolt, which may signify that the roulette ball has been released in to the wheel. Further, if the user maintains contact with the screen, the system may output additional pops each time the roulette ball bounces before settling on a number. Additional effects may be played as well.

For example, the user may allocate virtual casino chips 910 to the betting area for the roulette game. In such an embodiment, a user may make a betting selection by selecting a bet within the betting area 931. The user may then be provided with a slider 911 to select the number of chips to bet. As the user slides a finger along the slider, the user may feel a low magnitude, low frequency pulse for every 10 chips to be bet, for example. Other haptic effects may be incorporated into such a game, such as pressing an on-screen rocker switch may start an increasing or decreasing vibration corresponding to speed, magnitude, or some other parameter of the roulette wheel. Throwing an onscreen switch to activate the roulette ball may supply a pop feeling.

Playing a Virtual Slot Machine

Figure 10:
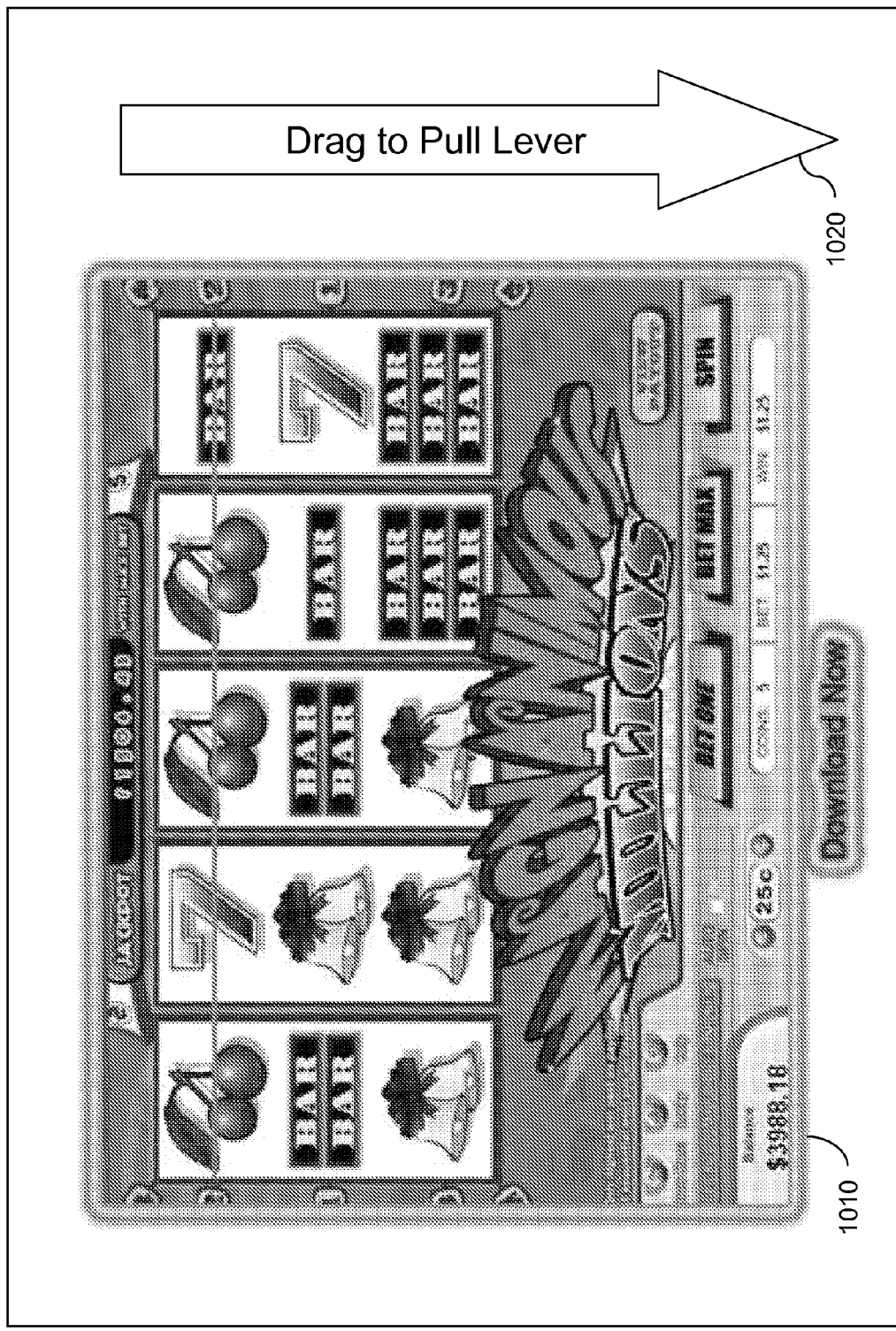

FIG. 10 shows a simulated screenshot of images associated with a casino gaming application executed by a system for casino gaming haptics according to one embodiment of the present invention. In the embodiment shown in FIG. 10, a casino gaming system is configured to allow the user to play a virtual slot machine. The user may be able to select a number of credits to wager, by pressing a button. The gaming system may provide haptic effects as the user presses the buttons. For example, the gaming system may generate a pop when the user presses a button to provide feedback that the button was pressed. The user may then be able to pull a virtual lever 1020 to begin the spinning of the virtual slot wheels 1030a-e. The gaming system may generate a low magnitude vibration when the lever 1020 has only been displaced a short distance, with the effect strengthening as the lever 1020 is displaced further. For example, in one embodiment of the present invention, the vibration may change frequency and/or vibration based on the displacement of the lever. When the user slides his finger off of the lever 1020 to activate the virtual slot wheels 1030a-e, a pop may be played to indicate the lever 1020 has been released. Additionally, a vibration may be output while the virtual slot wheels 1030a-e are spinning, with a high magnitude, high frequency effect being output when a virtual wheel 1030a-e comes to rest and an icon is displayed. A further haptic effect or haptic effects may be output when if the user wins credits based on the combination of icons presented by the virtual wheels 1030.

Trivia and Brain-Teaser Games

Figure 11:
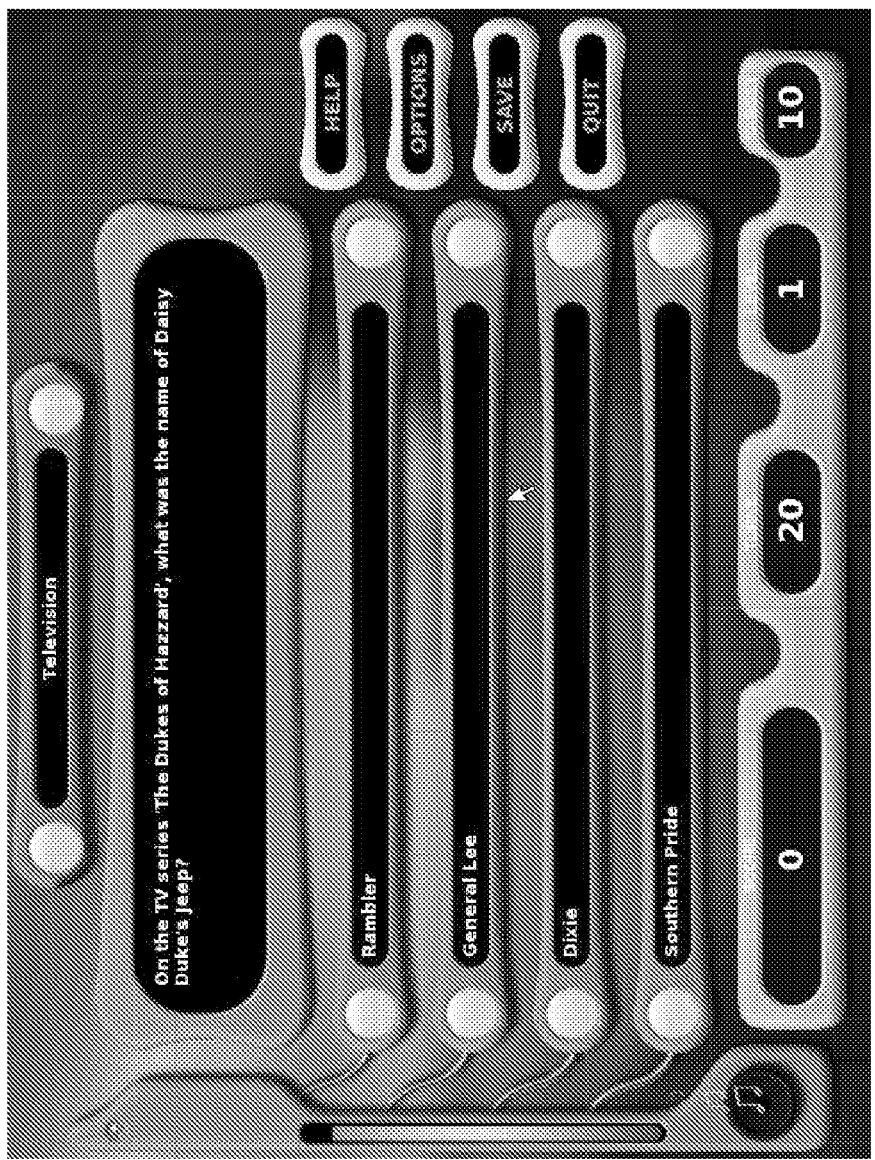
FIGS. 11-14 show games according to various embodiments of the present invention.

FIG. 11 shows a game according to one embodiment of the present invention. In the embodiment shown in FIG. 11, a user is presented with a trivia question and four potential answers to the trivia question. To play the game, a user may bet one or more chips prior to seeing a trivia question, and win chips by correctly answering the question. In such an embodiment, a user may receive haptic feedback in response to answering a question. For example, in one embodiment of the present invention, a system for casino gaming haptics may output a high-magnitude, low-magnitude effect to indicate a wrong answer. In one embodiment, a system for casino gaming haptics may output a high-magnitude, high frequency effect to indicate a correct answer.

Figure 12:
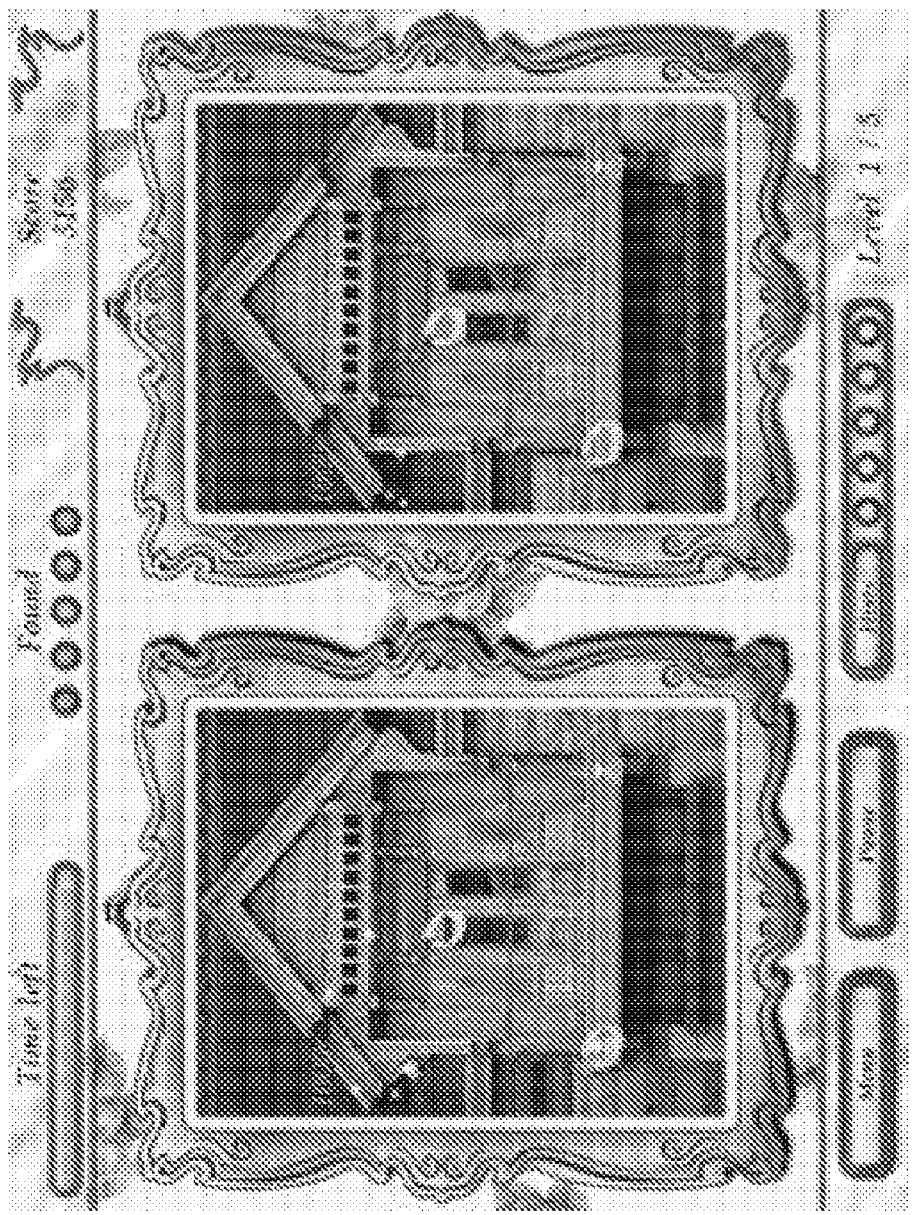

FIG. 12 shows a game according to one embodiment of the present invention. In the embodiment shown in FIG. 12, a user is presented with two nearly-identical images. In one embodiment of the present invention, the user attempts to locate the differences between the two images within a period of time. The user may bet chips according to the number of differences the user believes he can find between the two pictures, or the amount of time it will take to find the differences. The user may then touch a touch screen to indicate where a believed difference is located. In one embodiment of the present invention, a system for casino gaming haptics may output a pop effect to indicate that the user has correctly identified a difference between the two images. In one embodiment of the present invention, a system for casino gaming haptics may output two pops to indicate a wrong selection.

Figure 13:
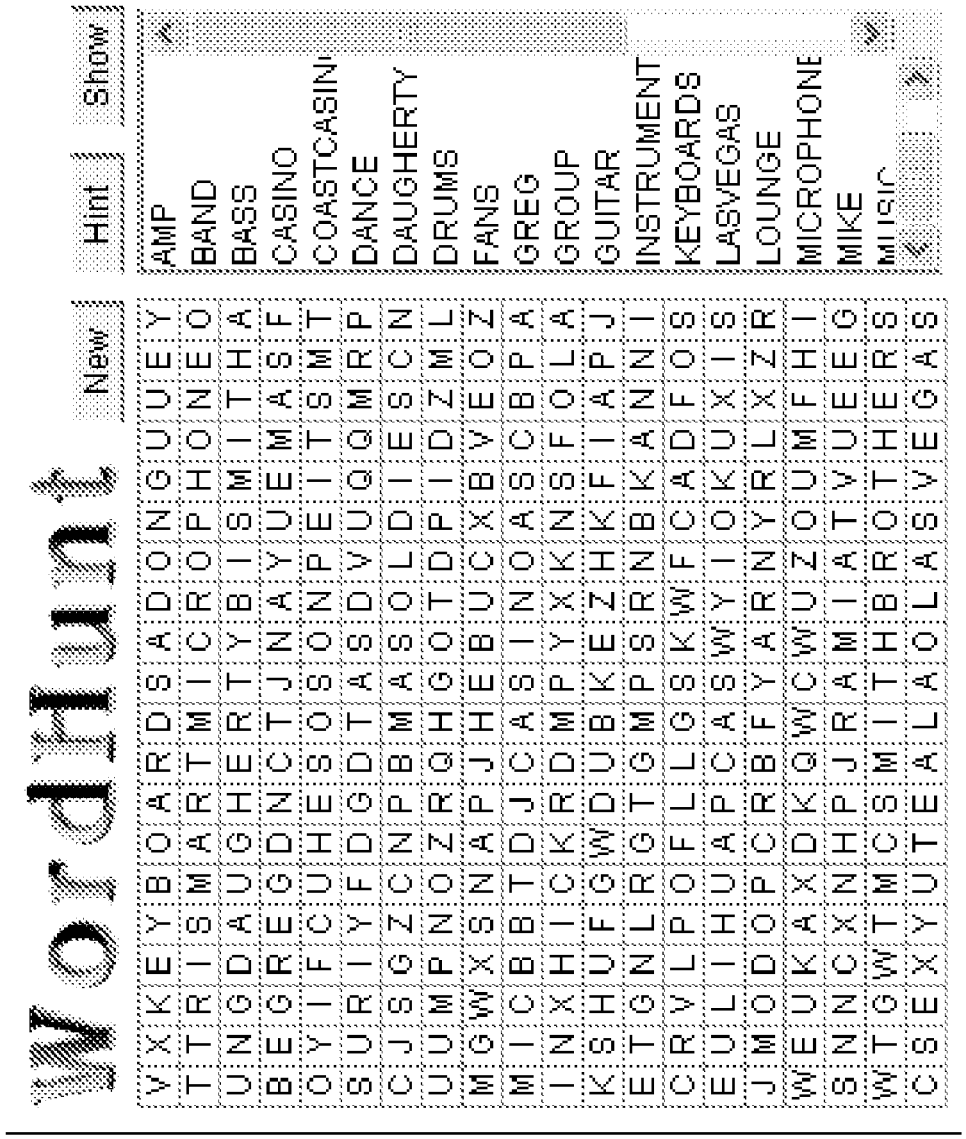

FIG. 13 shows a game according to one embodiment of the present invention. In the embodiment shown in FIG. 13, a user is presented with a matrix of letters, and a list of words that can be found within the matrix. A user may drag a finger along a series of contiguous letters to identify words within the matrix. A system for casino gaming haptics according to one embodiment of the present invention may output haptic effects as the user identifies a word within the matrix. For example, in one embodiment of the present invention, a system may output a low magnitude pop for each letter the user drags a finger across. When the user has correctly identified a word, the system may output a different effect, such as a high-magnitude, low-frequency effect. If the user does not correctly identify a word, the system may output a different effect, such as a high-magnitude, high-frequency effect.

In one embodiment of the present invention, a game may require that a user find one or more invisible objects hidden on the screen. In such an embodiment, a user may contact a touch screen and drag a finger to locate the object. When the user has contacted the object, the system may output a haptic effect to indicate that the user has found the object. Further, the system may output different effects for different hidden objects. For example, a user may attempt to find a hidden star among several hidden objects. The system may output a different haptic effect when the user has contacted the star than for other hidden objects.

Figure 14:

FIG. 14 shows a game according to one embodiment of the present invention. In the embodiment shown in FIG. 14, a user is presented with a game card that includes a plurality of scratch-off areas displayed on a touch screen. A user may rub their finger on the touch screen on an area corresponding to a scratch-off area to expose an image. While a user is rubbing their finger to scratch off an area, the system may output a vibration to indicate that the user is scratching an area. The system may then output a pop to indicate that the are has been substantially completely uncovered.

General

Embodiments of the present invention may provide a more enjoyable casino gaming experience. Certain embodiments of the present invention may, for example, provide enhanced game-play enjoyment through tactile feedback. By providing haptic effects, it may be possible to provide an experience in which the user feels as though he is touching a gaming implement, such as a playing card, rather than an input device, such as a touch screen. Haptic effects may allow a user to move a finger across a touch screen and feel a playing card shown on the screen, or feel the rattle of dice being shaken. Such tactile sensations may provide a richer, more immersive experience for a player of an electronic casino game.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A system, comprising:
a touch-sensitive input device configured to sense a contact from a user;
an actuator coupled to the touch-sensitive input device, the actuator configured to output a haptic effect to the touch-sensitive input device; and
a processor in communication with the touch-sensitive input device and the actuator, the processor configured to execute a casino game application, the casino game application configured to:
generate a display signal configured to cause an image associated with a card game to be displayed, the image comprising a plurality of playing cards and a discard area;
receive an input signal from the touch-sensitive input device associated with the contact;
determine a first interaction between the contact and the image;
determine a selection of a first playing card of the plurality of playing cards based on the first interaction;
generate a first actuator signal associated with the interaction, the actuator signal configured to cause the actuator to generate a first haptic effect;
transmit the first actuator signal to the actuator;
determine a gesture associated with the selection, wherein the gesture comprises a drag;
in response to the first playing card being dragged, generate a second actuator signal based on the gesture, the second actuator signal configured to cause the actuator to output a second haptic effect; and
transmit the second actuator signal to the actuator.

2. The system of claim 1, further comprising a display configured to receive the display signal and display the image associated with the card game.

3. The system of claim 1, wherein the touch-sensitive input device comprises a touch screen.

4. The system of claim 1, wherein the processor is in communication with a remote device.

5. The system of claim 4, wherein the processor is further configured to receive the card game from the remote device.

6. The system of claim 4, wherein the processor is further configured to transmit information to the remote device.

7. The system of claim 6, wherein the information comprises information associated with an action or a state of the card game.

8. The system of claim 1, wherein the actuator is also in communication with a housing.

9. The system of claim 1, wherein the processor is further configured to:
determine the first playing card has been discarded;
generate a third actuator signal, the third actuator signal configured to cause the actuator to output a third haptic effect; and
transmit the third actuator signal to the actuator.

10. A method comprising:
displaying an image associated with a card game, the image comprising a plurality of playing cards and a discard area;
sensing a contact with a touch-sensitive input device, the contact associated with the image;
receiving an input signal from the touch-sensitive input device, the input signal associated with the contact;
determining a first interaction between the contact and the image,
determining a selection of a first playing card of the plurality of playing cards based on the first interaction;
generate a first actuator signal associated with the interaction, the actuator signal configured to cause the actuator to generate a first haptic effect;
transmitting the first actuator signal to the actuator;
determining a gesture associated with the selection, wherein the gesture comprises a drag;
in response to the first playing card being dragged, generating a second actuator signal based on the gesture, the second actuator signal configured to cause the actuator to output a second haptic effect; and
transmitting the second actuator signal to the actuator.

11. The method of claim 10, wherein the haptic effect is associated with changing a bet amount.

12. The method of claim 10, wherein the haptic effect is associated with winning a game.

13. The method of claim 10, wherein the haptic effect is associated with losing a game.

14. The method of claim 10, further comprising:
determining that the first playing card has been dragged to the discard area;
in response to the first playing card reaching the discard area, generating a third actuator signal based on the gesture; and
transmitting the third actuator signal to the actuator.

15. The method of claim 10, wherein the first haptic effect comprises a pop and the second haptic effect comprises a low frequency vibration.

16. The method of claim 15, wherein the pop is output as a user selects a card.

17. The method of claim 10, wherein the second haptic effect comprises a vibration.

18. The method of claim 17, wherein the frequency of the vibration is associated with a speed of the drag gesture.

19. The method of claim 17, wherein the magnitude of the vibration is associated with a speed of the drag gesture.

20. The method of claim 19, wherein the first haptic effect comprises a pop.

21. The method of claim 10, further comprising:
determining the first playing card has been discarded;
generating a third actuator signal, the third actuator signal configured to cause the actuator to output a third haptic effect; and
transmitting the third actuator signal to the actuator.

22. The method of claim 21, wherein the third haptic effect comprises a high magnitude, high frequency effect.

23. The method of claim 10, further comprising receiving the card game from a remote device.

24. A non-transitory computer-readable medium on which is encoded program code, when executed by a processor is configured to perform the method comprising:
displaying an image associated with a card game, the image comprising a plurality of playing cards and a discard area;
sensing a contact with a touch-sensitive input device, the contact associated with the image;
receiving an input signal from the touch-sensitive input device, the input signal associated with the contact;
determining a first interaction between the contact and the image,
determining a selection of a first playing card of the plurality of playing cards based on the first interaction;
generate a first actuator signal associated with the interaction, the actuator signal configured to cause the actuator to generate a first haptic effect;
transmitting the first actuator signal to the actuator;
determining a gesture associated with the selection, wherein the gesture comprises a drag;
in response to the first playing card being dragged, generating a second actuator signal based on the gesture, the second actuator signal configured to cause the actuator to output a second haptic effect; and
transmitting the second actuator signal to the actuator.

25. The computer-readable medium of claim 24, wherein the processor-executed method further comprises:
determining the first playing card has been discarded,
generating a third actuator signal, the third actuator signal configured to cause the actuator to output a third haptic effect; and
transmitting the third actuator signal to the actuator.

26. The computer-readable medium of claim 24, wherein the processor-executed method further comprises receiving the card game from a remote device.

27. A device, comprising:
a housing;
a touch-sensitive input device;
an actuator configured to output a haptic effect to the touch-sensitive input device or the housing; and
a processor in communication with the touch-sensitive input device and the actuator, the processor configured to:
generate a display signal configured to cause an image associated with a slot machine game to be displayed, the image comprising a plurality of virtual slot wheels and a lever;
receive an input signal from the touch-sensitive input device associated with a contact,
determine a first interaction between the contact and the image,
determine a selection of the lever based on the first interaction;
generate a first actuator signal associated with the interaction, the actuator signal configured to cause the actuator to generate a first haptic effect,
transmit the actuator signal to the actuator;
determine a gesture associated with the selection, wherein the gesture comprises a drag;
in response to the lever being dragged, generate a second actuator signal based on the gesture, the second actuator signal configured to cause the actuator to output a second haptic effect; and
transmit the second actuator signal to the actuator.

28. The device of claim 27, wherein the processor receives the casino game application over a network from a server.

29. The device of claim 27, wherein the touch-sensitive input device comprises a touch-screen.

30. The system of claim 27, wherein the processor is further configured to:
request a casino game application from a server; and
receive the casino game application.

31. A method, comprising:
executing a casino game application, wherein the casino game application is configured to:
display an image associated with the card game, the image comprising a plurality of virtual slot wheels and a lever;
sense a contact with a touch-sensitive input device, the contact associated with the image;
receive an input signal from the touch-sensitive input device, the input signal associated with the contact;
determine a first interaction between the contact and the image, determine a selection of the lever based on the first interaction;
generate a first actuator signal associated with the interaction, the actuator signal configured to cause the actuator to generate a first haptic effect;
transmit the first actuator signal to the actuator;
determine a gesture associated with the selection, wherein the gesture comprises a drag;
in response to the lever being dragged, generate a second actuator signal based on the gesture, the second actuator signal configured to cause the actuator to output a second haptic effect; and
transmit the second actuator signal to the actuator.

32. The method of claim 31, wherein receiving the casino game application further comprises receiving haptic information associated with the casino game application.

33. The method of claim 31, further comprising:
requesting a casino game application from a server; and
receiving the casino game application.

34. A non-transitory computer-readable medium on which is encoded program code, when executed by a processor is configured to perform the method comprising:

displaying an image associated with a slot machine game, the image comprising a plurality of virtual slot wheels and a lever;

sensing a contact with a touch-sensitive input device, the contact associated with the image;

receiving an input signal from the touch-sensitive input device, the input signal associated with the contact;

determining a first interaction between the contact and the image, determining a manipulation of the lever based on the first interaction;

generating a first actuator signal associated with the interaction, the actuator signal configured to cause the actuator to generate a first haptic effect;

transmitting the first actuator signal to the actuator;

determining a gesture associated with the selection, wherein the gesture comprises a drag;

in response to the lever being dragged, generating a second actuator signal based on the gesture, the second actuator signal configured to cause the actuator to output a second haptic effect; and transmitting the second actuator signal to the actuator.

35. The computer-readable medium of claim 34, wherein the processor-executed method further comprises:

requesting a casino game application from a server; and
receiving the casino game application.

* * * * *